US011043143B2

(12) United States Patent
Ratcliffe et al.

(10) Patent No.: US 11,043,143 B2
(45) Date of Patent: Jun. 22, 2021

(54) SYSTEM AND METHOD FOR PERFORMING VIRTUAL SURGERY

(71) Applicants: United States Government As Represented By The Department Of Veterans Affairs, Washington, DC (US); Alan Bao-Chan Dang, Orange, CA (US)

(72) Inventors: Mark B. Ratcliffe, Piedmont, CA (US); Liang Ge, Foster City, CA (US); Alan Bao-Chan Dang, Orange, CA (US)

(73) Assignee: United States Government as Represented by the Department of Veterans Affairs, Washington, DC (US)

( * ) Notice: Subject to any disclaimer, the term of this patent is extended or adjusted under 35 U.S.C. 154(b) by 0 days.

(21) Appl. No.: 15/424,070

(22) Filed: Feb. 3, 2017

(65) Prior Publication Data

US 2017/0213480 A1 Jul. 27, 2017

Related U.S. Application Data

(63) Continuation of application No. 14/211,452, filed on Mar. 14, 2014, now Pat. No. 9,601,030.

(60) Provisional application No. 61/801,000, filed on Mar. 15, 2013.

(51) Int. Cl.
*G09B 23/28* (2006.01)
*G09B 5/00* (2006.01)
*G09B 9/00* (2006.01)

(52) U.S. Cl.
CPC .............. *G09B 23/28* (2013.01); *G09B 5/00* (2013.01); *G09B 9/00* (2013.01)

(58) Field of Classification Search
CPC ...... G09B 23/26; G09B 23/28; G09B 23/281; G09B 23/283; G09B 23/285; G09B 23/286; G09B 23/288; G09B 23/30; G09B 23/303; G09B 9/00; G09B 5/00
See application file for complete search history.

(56) References Cited

U.S. PATENT DOCUMENTS

2005/0187461 A1* 8/2005 Murphy ................. G09B 23/28
600/416
2014/0287393 A1* 9/2014 Kumar ................... A61B 34/35
434/262

* cited by examiner

*Primary Examiner* — Timothy A Musselman
(74) *Attorney, Agent, or Firm* — Ballard Spahr LLP

(57) ABSTRACT

A method and system are presented for performing virtual surgery simulations. The computer system includes a processor and a memory. The method includes receiving user input from a user via a user interface. The user input includes input representing surgical operations or non-surgical invasive procedures. The method also includes processing the user input and utilizing the input to generate or modify a computational model. The method also includes running simulations using the computational model in accordance with the user input. After running the simulations, the method further includes determining results from the simulations. The results correspond to probable effects or outcomes of performing real life surgical operations or non-surgical invasive procedures corresponding to the user input. Last, the method includes presenting the results to the user via the user interface.

20 Claims, 13 Drawing Sheets

SYSTEM AND METHOD FOR PERFORMING VIRTUAL SURGERY

CROSS-REFERENCE TO RELATED APPLICATIONS

This application is a continuation of and claims benefit under 35 U.S.C. § 120 to U.S. application Ser. No. 14/211,452, filed Mar. 14, 2014, titled "SYSTEM AND METHOD FOR PERFORMING VIRTUAL SURGERY" by Mark B. Ratcliffe et al., which claims benefit of prior application U.S. Provisional Application No. 61/801,000, filed Mar. 15, 2013, titled "SYSTEM AND METHOD FOR PERFORMING VIRTUAL SURGERY" by Mark B. Ratcliffe et al. Both applications are herein incorporated by reference in their entireties for all purposes.

TECHNICAL FIELD

The disclosed embodiments relate generally to computational modeling and simulations in computer systems.

BACKGROUND

Currently, practicing surgeons, clinicians, medical device engineers, scientists and trainees work with physical models or cadavers when developing novel surgical operations and non-surgical invasive procedures, training to perform surgeries or non-surgical invasive procedures, or developing instruments or implants related to those surgeries or non-surgical invasive procedures. Physical simulators made of rubber/plastic material in a "shoebox" are used by educators to evaluate how a trainee sutures or cuts. However, physical simulators and models have many limitations. More specifically, physical models made from materials such as plastic, rubber, latex, foam, metal, ceramics, or other manufactured materials do not provide the ability to fully replicate the consistency, texture, and physical properties of human tissue. Cadavers have many limitations as well. More specifically, cadavers do not allow the ability to compare the effects of one procedure with another procedure given that no two cadavers are identical. Additionally, a cadaver cannot fully replicate living human tissue due to the change in physical properties that occurs during the preparation and preservation of the tissue to prevent decomposition and the inherent inability for a cadaver to mimic living tissue such as muscle, which contracts. Thus, there exists a need for using computational modeling to simulate surgical operations and non-surgical invasive procedures. These same limitations to physical models and cadaver specimens affect medical device engineers in the development of new or refinement of existing instruments or implants. Additionally, practicing surgeons develop their surgical plan for an individual patient using "historical" information based upon their personal experience gained during training or while in practice from similar patients or published studies in medical literature reporting the outcome of a procedure from similar patients. The systems and method presented in the present disclosure allow for clinicians to predict the outcome of their surgery or non-surgical invasive procedure in advance, using computational modeling to simulate surgical operations and non-surgical invasive procedures, for their individual patients.

SUMMARY

In one aspect of the present disclosure, a method to be performed by a computer system is provided. The computer system includes a processor and a memory. The method includes receiving user input from a user via a user interface. The user input includes input representing surgical operations or non-surgical invasive procedures. The method also includes processing the user input and utilizing the input to generate or modify a computational model. The method also includes running simulations using the computational model in accordance with the user input. After running the simulations, the method further includes determining results from the simulations. The results correspond to probable effects or outcomes of performing real life surgical operations or non-surgical invasive procedures corresponding to the user input. Last, the method includes presenting the results to the user via the user interface.

In another aspect of the present disclosure, a system is provided. The system includes a user interface and a computer. The computer includes a processor and memory, and is configured to receive user input from the user interface, wherein the user input includes input representing surgical operations or non-surgical invasive procedures. The computer is further configured to process the user input and utilize the input to generate or modify a computational model. The computer is further configured to run simulations using the computational model in accordance with the user input. In addition, the computer is configured to also determine results from the simulations, wherein the results correspond to probable effects or outcomes of performing real life surgical operations or non-surgical invasive procedures corresponding to the user input. Last, the computer is configured to present the results to the user via the user interface.

In some embodiments of the present disclosure, processing the user input includes pre- and post-processing of data provided to a solver module.

In some embodiments, the user input is pre-processed before being received. In some embodiments, the method is performed dynamically while the user is performing steps of a surgery or non-surgical invasive procedure simulation. In some embodiments, the user input includes input from a keyboard, mouse, camera, microphone, tablet, cellular phone, any handheld device, or any haptic device capable of performing motions or functions representing surgical operations or other non-surgical invasive procedures that effect anatomic structures. In some embodiments, the user input is sent via a web browser or any application with access to the Internet. In some embodiments, processing the user input includes performing one more actions in a queue, utilizing the user input to generate or modify a computational anatomic model, the computational anatomic model being divided into one or more parts including a geometric mesh, material properties, and loading conditions. In some embodiments, the method further includes converting clinical imaging or information, such as blood pressure, height, weight, and lab results, into data and representing the data in a computational model including a geometric mesh, material properties, and loading conditions. In some embodiments, the user input includes surgical language and processing the user data includes converting, via a clinical translation module, the surgical language to changes or discrete values in a geometric mesh, material properties, or loading conditions of a computational model. In some embodiments, determining results of the simulation includes converting output geometric mesh, material properties, or other data with associated physical properties into surgical language. In some embodiments, the method further includes validating the user information submitted from the user system to the clinical system.

BRIEF DESCRIPTION OF THE DRAWINGS

Like reference numerals refer to corresponding parts throughout the drawings.

DESCRIPTION OF EMBODIMENTS

Figure 1A:
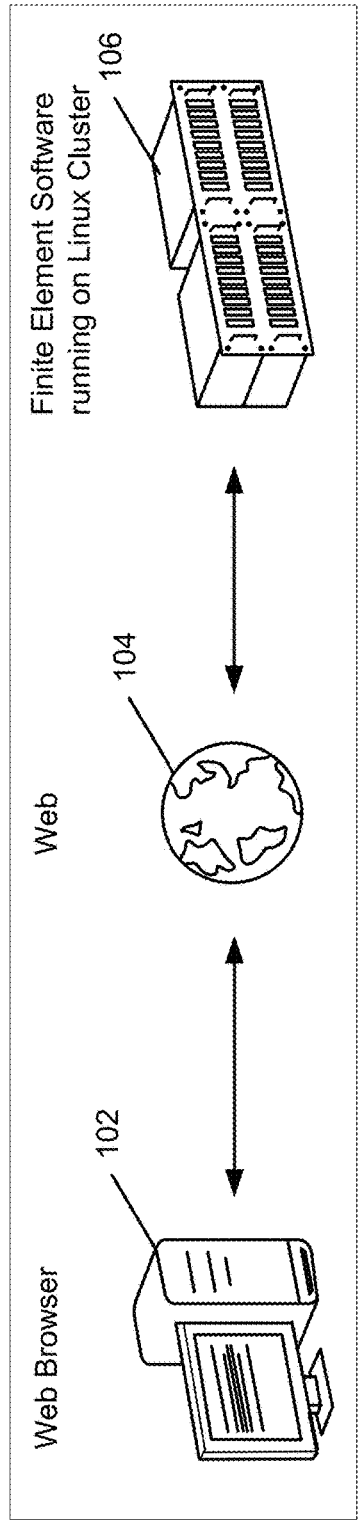
FIG. 1A is an overview of an example system for implementing various methods of the present disclosure.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

Definitions

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

As used herein, the term "user" is used interchangeably with "surgeon." In addition, as used herein, the term "user" is also used interchangeably with "trainee," "clinician," "engineer," and "scientist."

As used herein, the term "surgical language" is used interchangeably with "medical language." As used herein, the term "surgical language" is intended to mean the system by which physicians or surgeons or those in practice or development of medicine use to communicate or acquire thought or information. This includes letters, acronyms, words, symbols, signs, images, photographs, graphs, numbers, statistics and diagrams and other visual representations of information. It also includes sounds, tactile sensations, smell, and taste.

As used herein, the term "computational model" is intended to describe any set of mathematical equations, numerical methods, algorithms, symbolic computation, or manipulation of mathematical expressions or mathematical objects that can be used to describe or represent the physical mechanics or biology of the surgery to be studied. These models can be stochastic, deterministic, steady-state, dynamic, continuous or discrete.

As used herein, the term "medical imaging" is used interchangeably with "clinical imaging." As used herein, "medical imaging" is intended to describe any tool and the images generated by those tools that describe or quantify anatomic features, e.g. x-rays, computed tomography (CT) scans, magnetic resonance imaging (MM), and ultrasound.

As used herein, the term "surgery" is used interchangeably with "surgical operation."

As used herein, the term "non-surgical invasive procedure" is used interchangeably with "medical intervention." As used herein, the term "non-surgical invasive procedure" is used interchangeably with "interventional procedures." In addition, as used herein, the term "non-surgical invasive procedure" is used interchangeably with "minimally invasive procedure."

As used herein, the terms "surgery" and "non-surgical invasive procedure" are intended to describe any set of actions that alters anatomy directly or indirectly. In addition, as used herein, the terms "surgery" and "non-surgical invasive procedure" include actions involved in the development of an implant, device, or product that alters anatomy directly or indirectly. An example of direct alteration of anatomy includes the use of a surgical instrument to cut or modify tissue. An example of indirect alteration of anatomy includes the use of medications that increase the strength of heart muscle contraction or increases the bone mineral density of the skeleton.

As used herein, the terms "surgery" and "non-surgical invasive procedure" are intended to describe any set of actions performed by a user that would require or be expected to require informed consent from a patient if performed or used clinically, regardless of whether or not the present use of the present disclosure is in a clinical setting.

As used herein, the distinction between a surgery and a non-surgical invasive procedure reflects the difference in visibility of the anatomy that is expected to be available to the user. In a surgery, direct visualization is used more than indirect visualization. In a non-surgical invasive procedure, indirect visualization is used more than direct visualization. In a scenario where direct visualization and indirect visualization are used equally, the user's activity is considered both a surgery and a non-surgical invasive procedure. Direct visualization reflects a direct optical pathway between the anatomy and the user and in some cases will include optics to assist with magnification or visualization. Indirect visualization reflects the use of an intermediate tool such as camera, fluoroscopy, CT, MRI or ultrasound where the user does not have a direct optical pathway to the anatomy.

As used herein, the term "solver" is used interchangeably with "solver module" and is intended to describe any set of numerical methods that are used to represent true physical phenomena such as Newton's Laws of Motion that provides sufficient accuracy to reflect clinical reality. The "finite element" approach is one such example that can be used in one embodiment of the present disclosure. The present disclosure is not restricted to the use a "finite element" based solver. In some embodiments, the solver module uses numerical methods of simulation such as finite difference, finite volume, finite element, Arbitrary Lagrangian-Eulerian, Navier-Stokes, or Conservation Element & Solution Element methods for fluid modeling.

As used herein, the action of "alteration of anatomy" refers to any action that can be represented as a change to a description of a geometric mesh, a material property, or any loading conditions.

As used herein, the term "geometric mesh" refers to any generated description that describes or defines the physical shape, micro- and macro-structure, or form of one or more anatomic structures.

As used herein, the term "material property" refers to any description of the physical characteristics of the anatomy described by the geometric mesh in response to physical loads. In addition, as used herein, "material property" also refers to the response to pharmacologic, electrical, magnetic, or heating or cooling interventions. In addition, as used herein, "material property" also refers to any characteristic of anatomy that can be represented as physical changes, whether directly or indirectly through biological changes.

As used herein, the term "loading condition" refers to any description of the physical loads applied to or experienced by the anatomy. In addition, as used herein, the "loading condition" includes any description of pharmacologic, electrical, magnetic, or heating or cooling interventions.

As used herein, the term "clinical information" refers to medical imaging, laboratory results such as serum potassium or calcium levels, physical examination results such as blood pressure, height, patient history such as occupation, use of tobacco products, and any additional clinical data describing a patient that can be represented as a change to the anatomy through a description of a geometric mesh, a material property, or a loading condition.

As used herein, the term "patient" refers to both an entire individual as an organism as a whole as well as any subset of the patient's anatomy such as a patient's organ system (e.g., cardiopulmonary system reflecting the heart and lungs and the associated connective tissue), an individual organ (e.g., a heart), a substructure of an organ (e.g. a heart valve), a substructure of a substructure (e.g. a leaflet of a heart valve), or a substructure of a substructure of the substructure (e.g. collagen bundle of a leaflet of a heart valve). There is no limit to the restriction to minimum size of the subset of the anatomy as the size is defined by the user's request and anatomy of interest.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

For example, the techniques of the present disclosure will be described in the context of fragments, particular servers and encoding mechanisms. However, it should be noted that the techniques of the present disclosure apply to a wide variety of different fragments, segments, servers and encoding mechanisms. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

EXAMPLE EMBODIMENTS

FIG. 1 illustrates a general overview of an example system (100) for implementing various methods of the present disclosure. In particular, FIG. 1A describes a user accessing the Internet or Web (104) using a computer (102) configured with a web browser to interact with another computer configured as a server (106) containing modules required for fulfilling the user's simulation request.

Figure 1B:
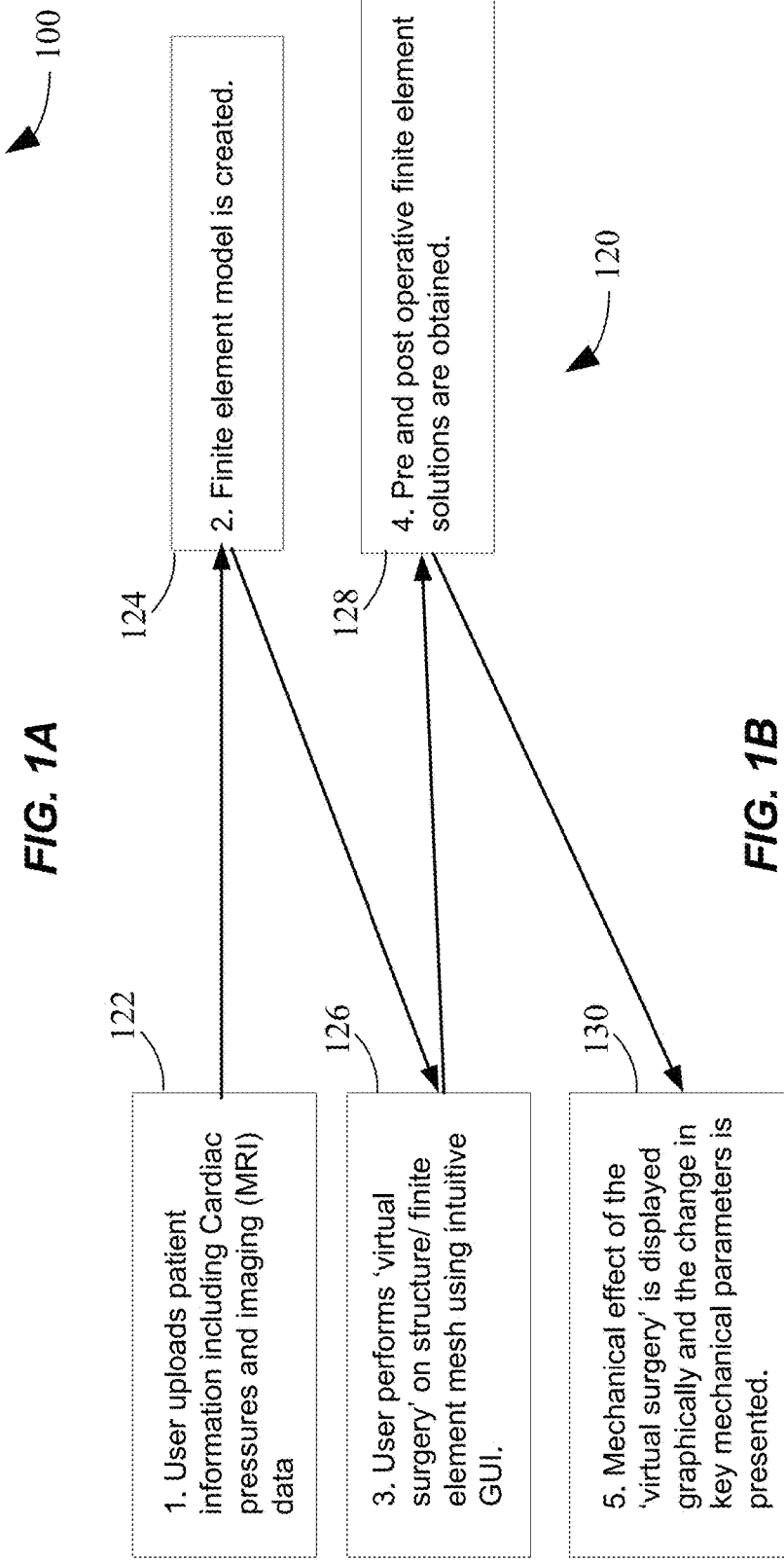
FIG. 1B is a flow diagram illustrating an overview of an example process implemented with the example system in FIG. 1A, in accordance with various embodiments of the present disclosure.

FIG. 1B is a flow diagram illustrating an overview of an example process (120) implemented with the example system in FIG. 1A. In this example, the user provides patient information including cardiac pressures and imaging data such as MM (122) to the server. Once the data is received by the server, a computational model is created (124). In some embodiments, the computational model is a finite element model. The server provides information back to the user that will allow the user to perform virtual surgery (126). This is done using a graphical user interface (GUI). Once the user has completed the virtual surgery, the data is sent back to server where pre- and post-operative assessment is obtained through finite element analysis (128). The server then provides data back to the user to detail the mechanical effect of virtual surgery and the change in key mechanical pressures is presented (130).

According to various embodiments, virtual surgery simulations are based upon the use of a prototypical source model, e.g., a three-dimensional (3-D) computational model representing a physical object, such as an individual patient or a hypothetical patient made from averages. In some embodiments, the 3-D model contains one or more geometric meshes, material properties, and loading conditions. In some embodiments, parametric analysis is performed by changing the mesh geometry (altering the shape of the patient) or adding or removing the mesh geometry. In some embodiments, changing the assigned material properties (altering the stiffness/softness of the tissue) is performed. In some embodiments, changing the loading conditions (e.g. blood pressure) is performed. In some embodiments, small, directional increments in the geometric mesh, material properties, or loading conditions are performed followed by observations. Parametric analysis in this way allows for understanding, in general terms, of the consequences or benefits of an action. For instance, if a heart is to be resized, the starting point would be a normal heart. Then, incrementally, the heart is adjusted to be smaller and smaller or bigger and bigger. Another example is a spine fusion. With parametric analysis, differences between a one or two-level fusion can be readily observed. Another example is a meniscectomy of the knee. With parametric analysis, the optimal amount of meniscus to be removed can be readily observed. Various surgical operations and other non-surgical invasive procedures and devices can be simulated in this way.

The following example illustrates an exemplary embodiment of the present disclosure. In this embodiment, the user is a practicing surgeon interested in determining the effects of performing a mitral valve repair on a specific patient. The surgeon begins by taking a MRI of the patient's heart in the pre-operative state and then sends it to the server along with relevant patient information such as age, blood pressure, and current medications (122). This is performed using a web browser (102). This data is received by the server (106) via the Internet (104) and processed by a clinical translation module. The module recognizes that the mitral valve repair requires a computational model of the left ventricle and mitral valve. MRI data is sent from the "clinical translation module" to an "information integration module" where a geometric mesh representing the left ventricle and mitral valve is created. The geometric mesh is then assigned material properties based upon both values in the MRI and a known database of materials in clinical translation module. The age, blood pressure and current medications are used to further refine the material properties and establish the loading conditions for the computational model. This process generates a finite element model (124) which is then shown to the surgeon via a user interface. Through this interface, the surgeon performs the mitral valve repair, selecting the portion of the posterior mitral valve leaflet to be excised, the manner in which the remain free ends of the leaflet are sutured, and then the manner in which an annuloplasty ring is implanted and sutured (126). In this example, the surgeon uses the graphical interface to replicate the surgery illustrated in FIG. 3. The surgeon will identify the mitral valve (300) including the anterior (306) and posterior (308, 312, and 310) leaflets. In this example patient, the middle section of the posterior leaflet is prolapsing and causing the valve to leak (mitral regurgitation). The surgeon uses a scalpel (305) and forceps (302) to excise out the triangular section of the mitral valve prolapse (312) along the dotted lines. The resulting triangular defect between the left (308) and right (310) scallops of the posterior mitral leaflet caused by the excision of the prolapsing segment are identified. The surgeon places sutures (322) to bring the cut edges of the leaflet together. The repaired leaflet (308, 310) after the sutures (322) have been tied. The surgeon then applies a supporting or buttressing "annuloplasty" ring (360, 362). In this example, the surgery is expected to result in a repaired valve that is competent and functional.

The surgeon's actions are stored in a queue and sent back to the server (106) for further processing. The clinical translation module translates the queue of actions into a series of modifications to a geometric mesh, material property, and/or loading condition. The translation is performed by a database within the clinical translation module, and actions by the surgeon that are outside of the database are submitted to the information integration module for further processing. The information integration module will either combine imaging data or other clinical information to determine how the action in the queue will be represented as changes to a geometric mesh, material property, and/or loading condition. If the information integration module is unable to determine the optional representation needed for the solver module, the surgeon's action is flagged for human evaluation and modification. After the surgeon's input has fully been processed, it is provided to the solver module. The solver module uses realistic mathematical simulation to perform the surgery as described by the surgeon. This entire sequence of steps (128) results in a mathematical representation of the surgical outcome. The clinical translation module then converts the output from the solver module into surgical language. This is then presented to the surgeon (130). In this example, the outcome will be presented as a visual animation of the beating left ventricle and motion of the mitral valve before and after surgery along with changes in key mechanical parameters for this surgery (130). In this example, the clinical translation module will report cardiac outcome parameters based upon the location of the surgery such as the force across the sutures, the stress to the fibers of the muscle at the different regions of the left ventricle, as well as the pressure and stress to the mitral valve leaflets.

In some embodiments, parametric analysis is requested by the clinical translation module to be performed by the solver module. After the user performs virtual surgery (126), the clinical translation module will evaluate the outcome of small perturbations in the surgeon's technique. For example, in some embodiments different annuloplasty rings (362) from different device manufacturers made from different materials or shapes can be simulated with the change in outcome, if any, reported to the surgeon (130). In some embodiments, the number of sutures (322) used is increased or decreased. In some embodiments the amount of the leaflet to be removed (312, dashed lines) is increased or decreased. In some embodiments, the clinical translation module will continue to test additional perturbations and report the outcome of the surgeon's plan in comparison to the optimal approach as determined through this iterative parametric analysis.

In another embodiment, a similar set of steps can be used to evaluate a trainee and determine if the steps made by the trainee in surgery (126) result in a clinically successful outcome. In some embodiments, surgical complications will be introduced such as a failure of a suture (322) to determine if the trainee will recognize the problem and make the appropriate surgical maneuvers to correct the failure.

In some embodiments, the user is a device engineer or scientist and a similar set of steps can be used to evaluate the optimal conditions for implanting a device or the optimal characteristics of a device.

In some embodiments, the user is interested in understanding the effects of a surgery generally for an improved understanding of the actions of specific alteration of anatomy. In some embodiments, there is no specific patient of interest, no specific device or instrumentation of interest, and no assessment of skills to be performed.

In some embodiments, the user can alter the anatomy in real-life through a surgical operation or a non-surgical invasive procedure. In some embodiments, the user will use the present disclosure to evaluate the technical difficulty of the approach to anatomic alteration. In some embodiments, the user will use the present disclosure to determine the portions of the procedure which are best achieved through a surgery and a non-surgical invasive procedure.

In some embodiments, the data submitted by the user (122) contains additional types of clinical imaging such as CT scan or additional information or data in surgical language. In some embodiments, the data submitted by the user excludes cardiac pressures and MM. The present disclosure is not restricted to a requirement for input of cardiac pressures and MM. In some embodiments, the user will submit a complete existing computational model and bypass the need for the server (106) to create a model (124). In some embodiments, the user will submit an incomplete computational model containing one or more geometric meshes, material properties, or loading conditions.

In some embodiments, the user input is performed using a keyboard or mouse. In some embodiments, other input may be used including point and click with a mouse, voice activated input, typing input via a keyboard, scanned input via cameras or motion sensors, or input from handheld devices such as a smart phone or tablet PC. Input can also be made via any haptic device capable of performing motions or functions representing surgical operations or other interventions or procedures that affect anatomic structures. The motions or functions are captured and stored for processing or transmission. In some embodiments, there is a direct translation of the input actions to the computational model.

According to various embodiments, the system providing the clinical translation module, through a combination of automated tools and/or human labor, translates the user input representing virtual surgical operations into input for the solver module. In some embodiments, this includes describing in surgical language, via a text or graphical interface, the planned procedure.

According to various embodiments, the system providing the clinical translation module, through a combination of automated tools and/or human labor, translates the output of the solver module representing the outcome or result of virtual surgical operations into surgical language. In some embodiments, this reporting of information in surgical language, occurs via a text or graphical interface.

According to various embodiments, data available to the clinical translation module is made available to the information integration module for additional pre- and post-processing before input is provided to the solver module or output is provided to the user.

According to various embodiments, the system providing the information integration module, through a combination of automated tools and/or human labor, translates the user input representing "clinical information" into alterations of a geometric mesh, a material property, or a loading condition.

In some embodiments, clinical imaging data available to the information integration module lacks sufficient visual fidelity to identify anatomic structures of importance. One such example would be the intermeniscal ligaments that connect the medial meniscus and lateral meniscus of the knee. In some embodiments, the information integration module will generate a geometric mesh, material property, or a loading condition representing structures that are known to exist despite the absence of the structure on imaging based upon landmarks that are visible. One such example would be generating a computational model of the intermeniscal ligaments based upon the location of the anterior horn of the medial meniscus and lateral meniscus. In some embodiments, the addition of computational models of anatomic structures not visible in the imaging data occurs without additional user input. In other embodiments, the addition of computational models of anatomic structures not visible in the imaging data occurs with user input.

In some embodiments, clinical information necessary for a computational model used by the solver module is not available to the information integration module. One such example would be a user that has not specified the blood pressure, or a height, or a weight as input. In some embodiments, the information integration module will provide the missing clinical information necessary for a computational module used by the solver module. In some embodiments, the substituted information reflects a 50th percentile value. In some embodiments, the substituted information reflects a 5th percentile value. In some embodiments, the substituted information reflects a 95th percentile value. In some embodiments, the substitution of clinical information is performed without additional user input. In other embodiments, the substitution of clinical information occurs with user input.

According to various embodiments, the system providing the information integration module exchanges data to translate the user input into alterations of a geometric mesh, a material property, or a loading condition or into a surgical language that can be processed by the clinical translation module.

The following example illustrates another exemplary embodiment of the present disclosure. In this embodiment, the user is a trainee interested in understanding the effects of performing a medial meniscectomy in the knee without a specific patient in mind or surgical goal. In this embodiment, the trainee uses a pre-existing template representing a computational model of the knee and does not need to upload any new information to the server nor does the server need to create a new computational model. Using the standardized template computational model of the knee, the trainee identifies the geometric mesh representing the medial meniscus and uses the user interface to remove this structure. The trainee then selects the loading condition of a standing patient for analysis. The system mathematically identifies the resulting varus moment and presents the output to the user in surgical language via the user interface.

In some embodiments a template computational model represents an average patient. In other embodiments, the template computational model represents a patient with anatomy that does not have an average geometric mesh, material property, or loading condition. One such example would be a patient with a disease.

In some embodiments, the user will alter a geometric mesh directly to determine the effects of that action. In some embodiments, the alteration is done using surgical language. In some embodiments, the alteration is done through manipulation of a geometric mesh directly through the user interface.

In some embodiments, the user will alter a material property directly to determine the effects of that action. In some embodiments, the alteration is done using surgical language. In some embodiments, the alteration is done through manipulation of a material property directly through the user interface.

In some embodiments, the user will alter a loading condition directly to determine the effects of that action. In some embodiments, the alteration is done using surgical language. In some embodiments, the alteration is done through manipulation of a loading condition directly through the user interface.

Figure 2A:
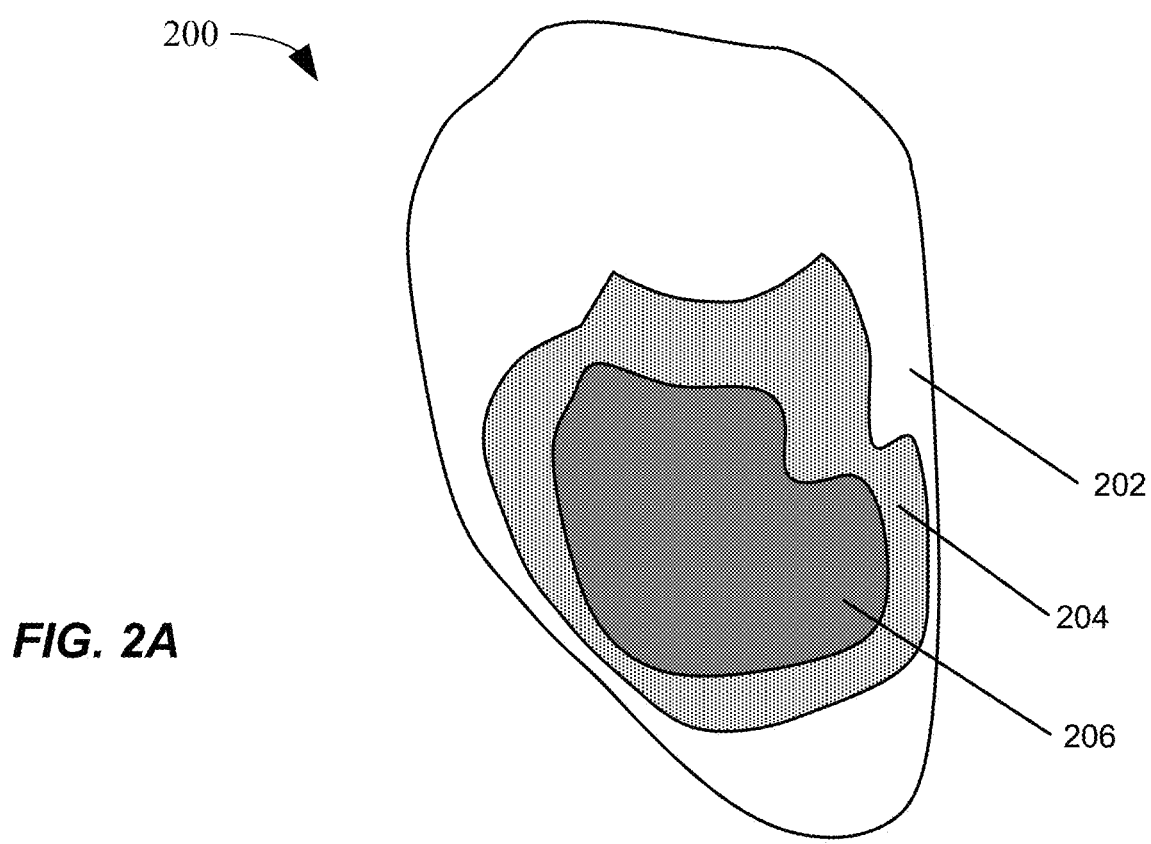
FIGS. 2A and 2B illustrate various aspects of a real heart, in accordance with various embodiments of the present disclosure.
Figure 2B:
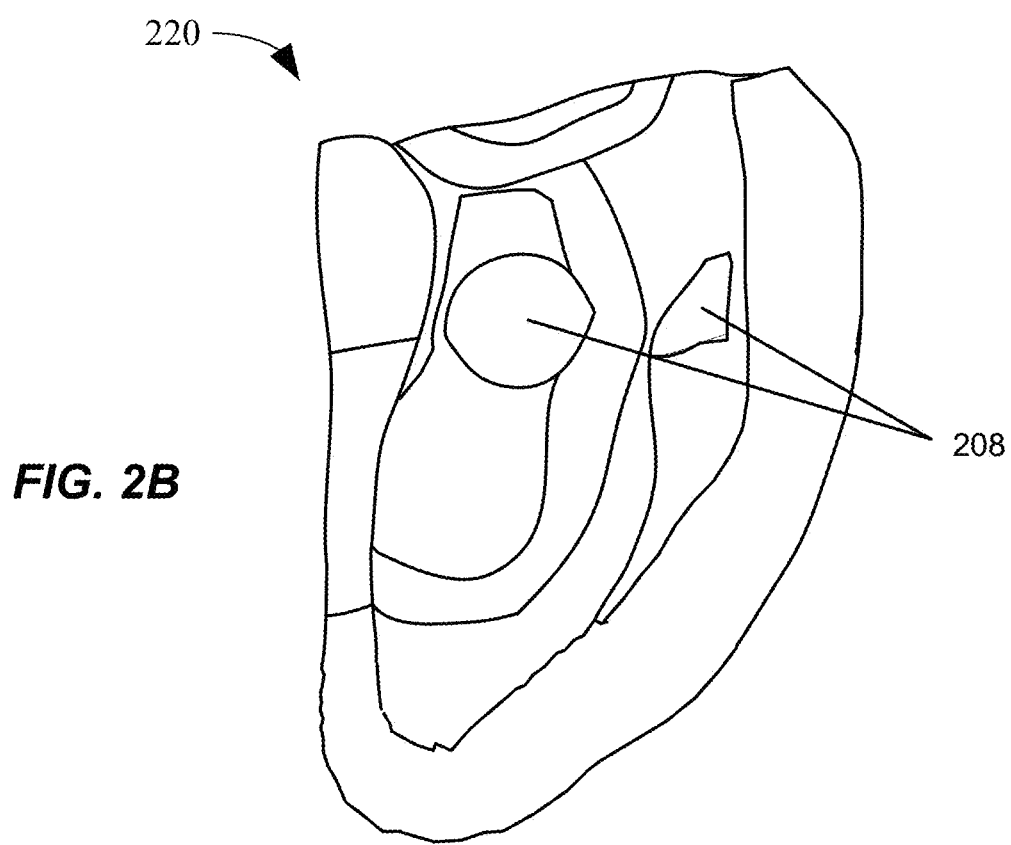

FIGS. 2A and 2B are exemplary drawings of the various aspects of a real heart, in accordance with various embodiments of the present disclosure. FIG. 2A shows the outside of the left ventricle (200) and in this case also shows an area of heart attack (myocardial infarction (MI) where the MI (206) is surrounded by a border of poorly contractile heart muscle (204) and the normal undamaged heart muscle (202). FIG. 2B shows the inside of the left ventricle (220). The mitral valve is the inflow valve to the left ventricle and FIG. 2B further shows the muscular connections or papillary muscles (208) by which the valve is connected to the left ventricular wall.

Figure 2C:
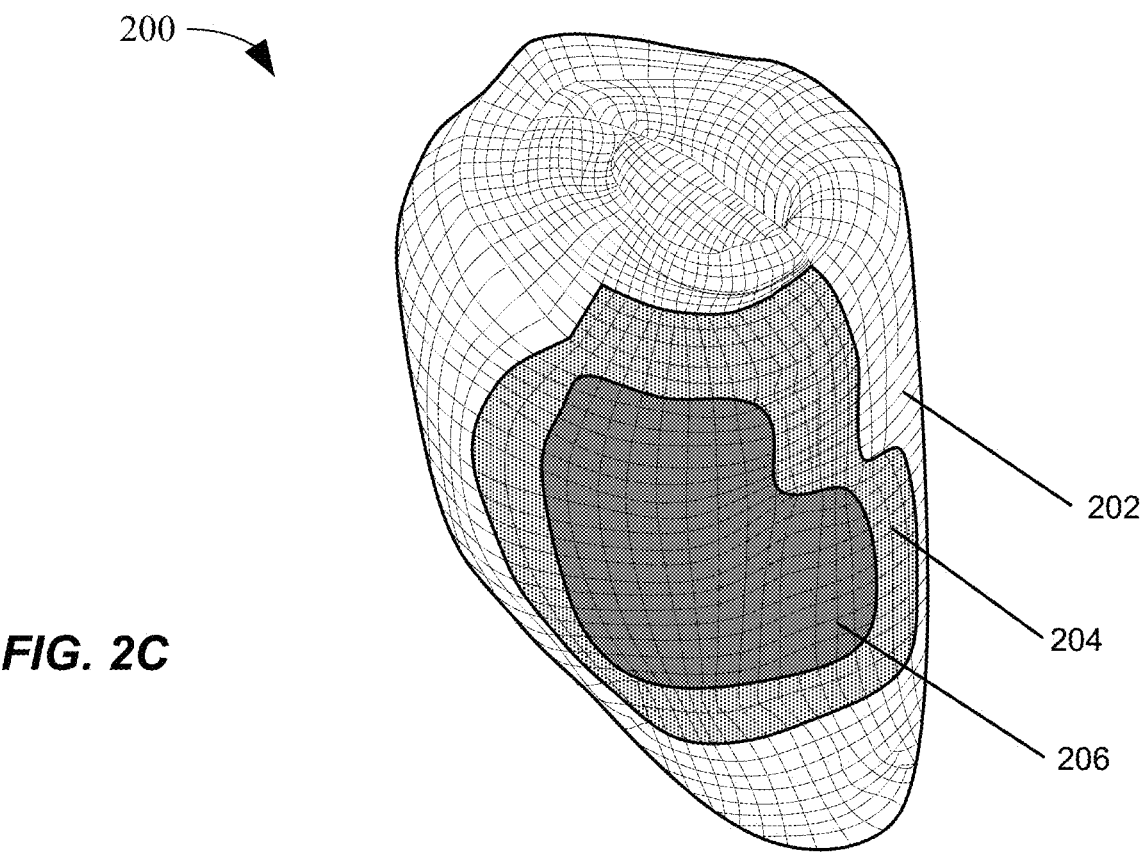
FIGS. 2C and 2D illustrate examples of geometric mesh models corresponding to the various aspects of a real heart presented in FIGS. 2A and 2B, in accordance with various embodiments of the present disclosure.
Figure 2D:
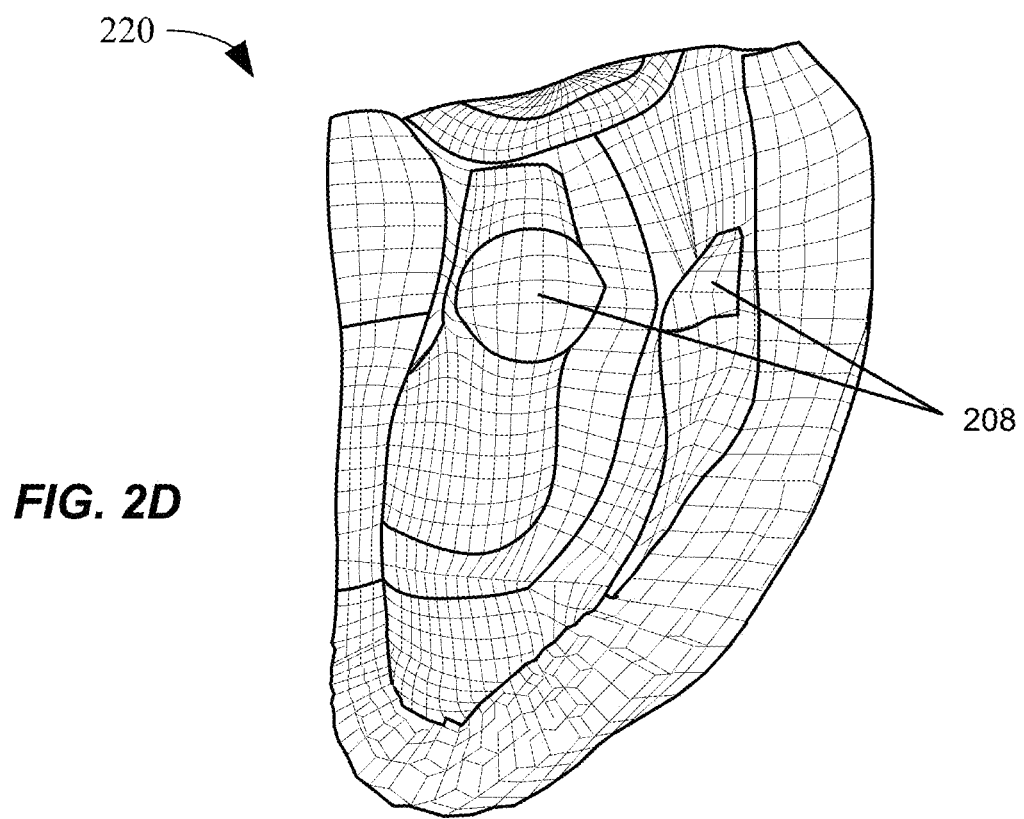

FIGS. 2C and 2D illustrate examples of geometric mesh models similar to models that would be created by exemplary systems such as system 100 in FIG. 1. In this exemplary case, FIGS. 2C and D correspond to the various aspects of a real heart presented in FIGS. 2A and 2B, in accordance with various embodiments of the present disclosure. Specifically, as in FIG. 2A, the mesh model in FIG. 2C shows the area of myocardial infarction (206), surrounded by a border of poorly contractile heart muscle (204) and beyond that the normal undamaged heart muscle (202). As in FIG. 2B, FIG. 2D shows the inside of the left ventricle (220) where in this case the muscular connections to the mitral valve or papillary muscles are seen (208) with their connections (chordae) to the mitral valve at the top of the left ventricle.

Figure 3B:
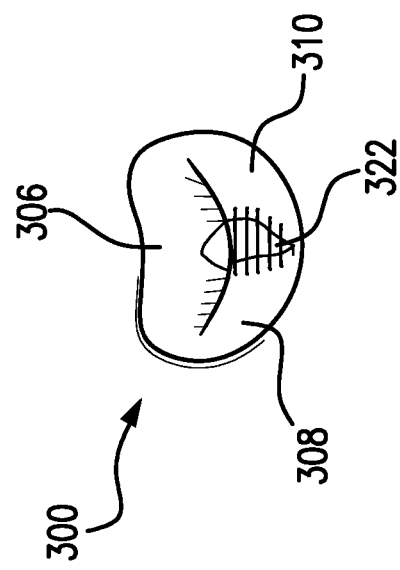
FIGS. 3A-3D depicts an example of a typical surgical procedure for mitral valve repair, in accordance with various embodiments of the present disclosure.
Figure 3D:
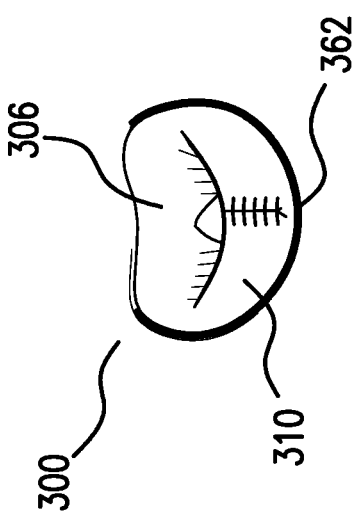
Figure 3A:
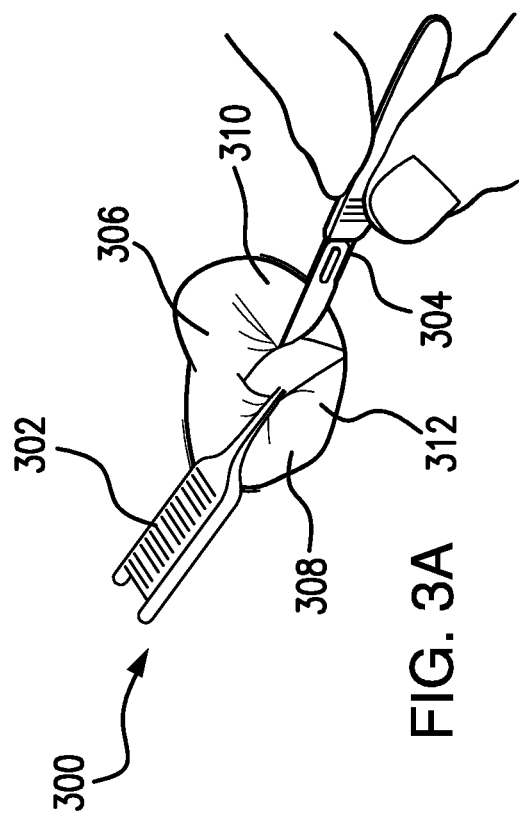
Figure 3C:
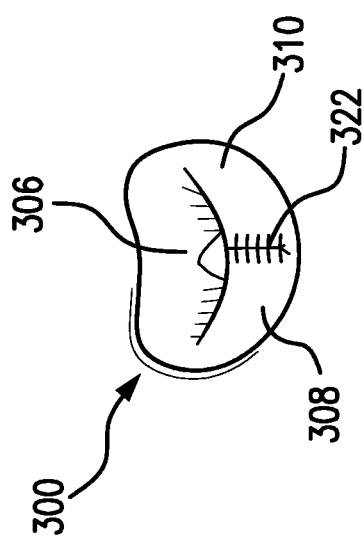

FIGS. 3A-3D illustrate an example of the steps involved in a typical cardiac surgical procedure, in accordance with various embodiments of the present disclosure. In this exemplary case, a mitral valve repair procedure is illustrated. The illustrations show the mitral valve (300) including the anterior (306) and posterior (308 and 310) leaflets. In this case, the middle section of the posterior leaflet is prolapsing and causing the valve to leak (mitral regurgitation). In FIG. 3A, the surgeon is performing a mitral valve repair procedure to repair the mitral valve prolapse (312). Specifically, FIG. 3A shows the surgeon grasping the prolapsing segment (312) of the posterior leaflet of the valve (308, 310) with forceps (302). A scalpel (304) is being used to excise a triangular section (dotted lines) of the prolapsing segment (312). FIG. 3B shows the triangular defect between the left (308) and right (310) scallops of the posterior mitral leaflet caused by the excision of the prolapsing segment. In this case, sutures (322) are now in place to bring the cut edges of the leaflet together. FIG. 3C shows the repaired leaflet (308, 310) after the sutures (322) have been tied. Finally, FIG. 3D shows the application of a supporting or buttressing "annuloplasty" ring (362). The valve should now be competent.

Figure 4A:
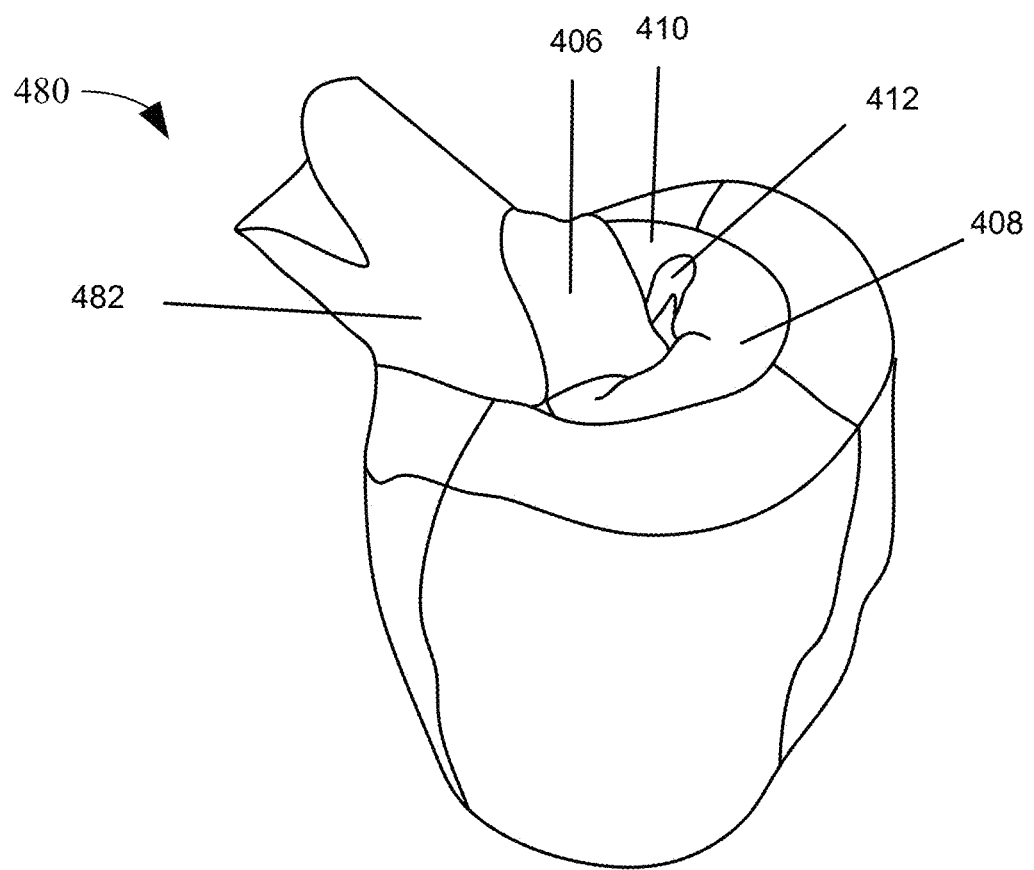
FIGS. 4A-4F are examples of simulating a mitral valve repair procedure using computational modeling, in accordance with various embodiments of the present disclosure.
Figure 4B:
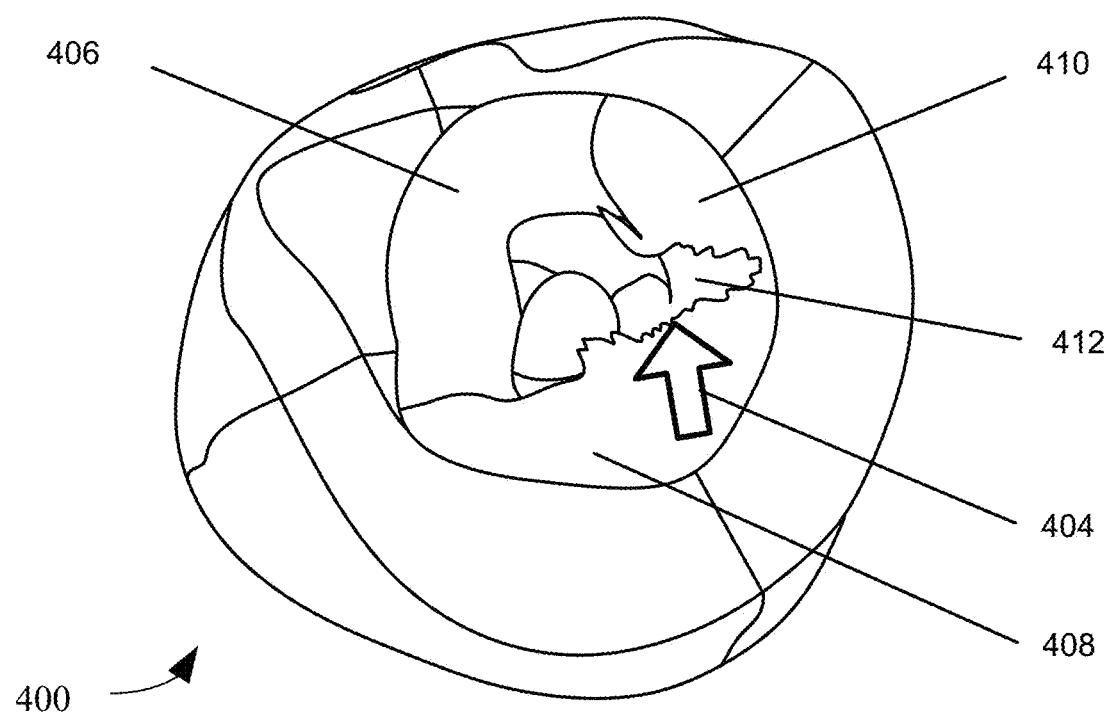
Figure 4C:
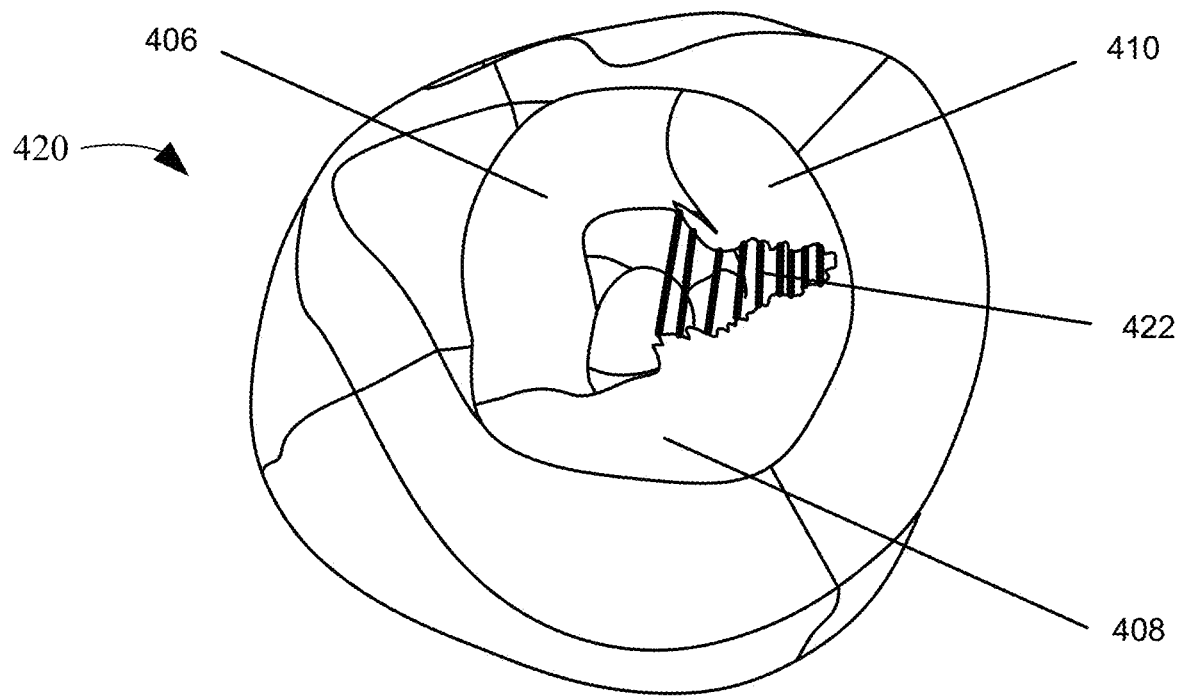
Figure 4D:
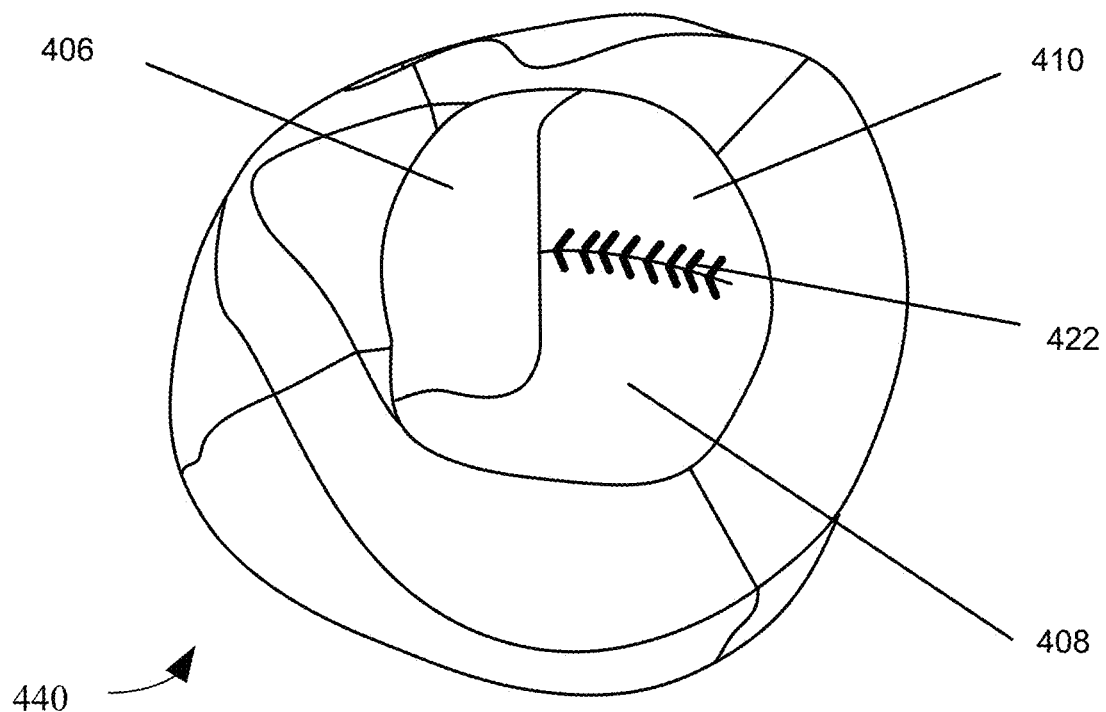
Figure 4E:
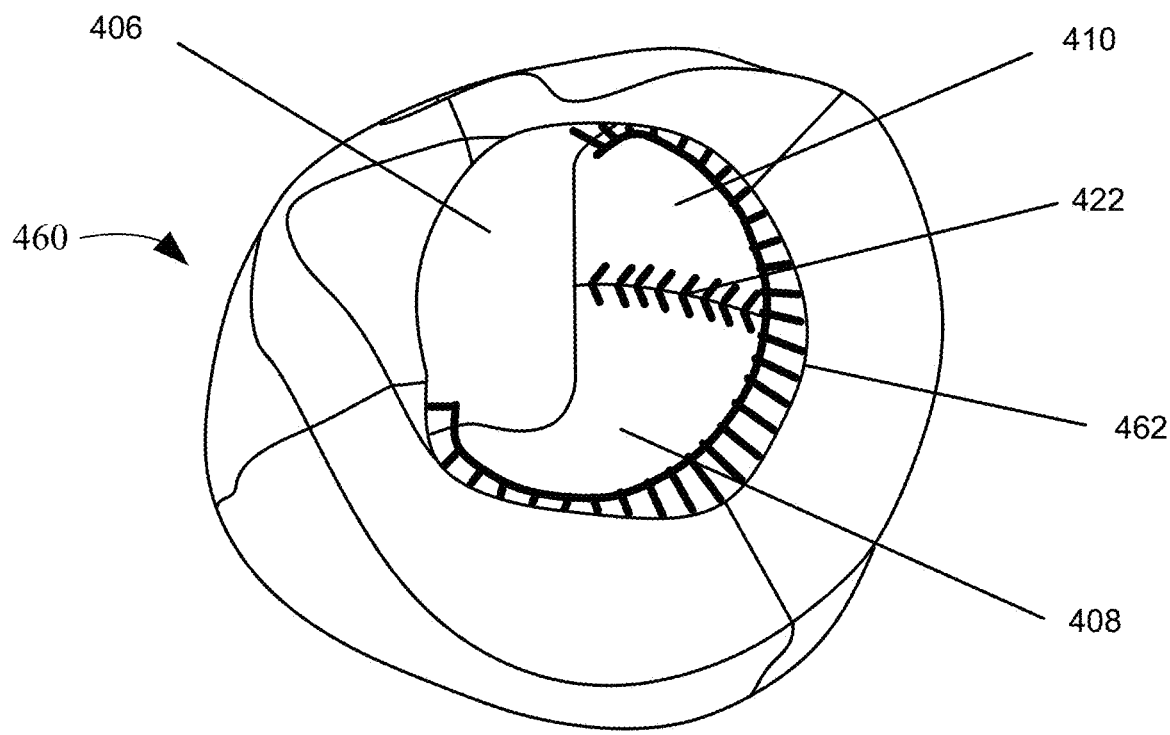
Figure 4F:
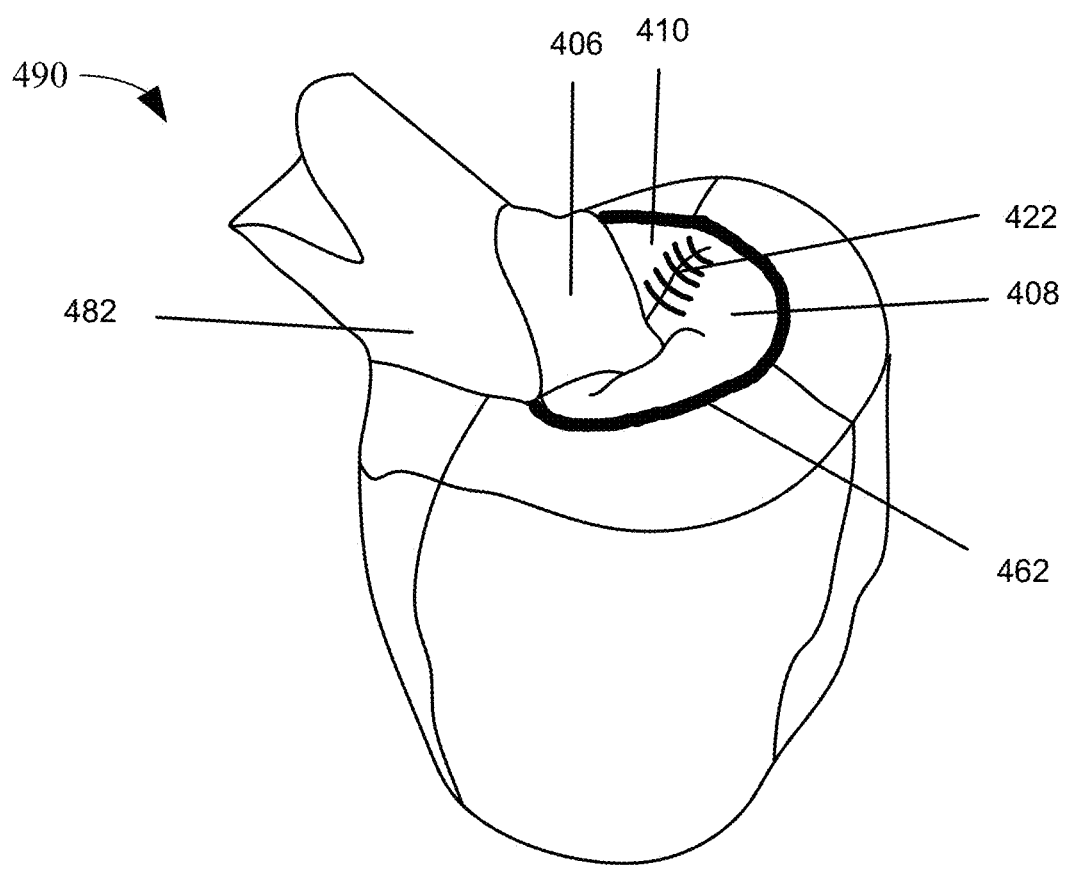

FIGS. 4A-4F are examples of simulating a mitral valve repair procedure using computational modeling in accordance with various embodiments of the present disclosure. In this case, the computational model corresponds roughly to the steps of the operation illustrated in FIGS. 3A-3D. FIG. 4A shows the mitral valve and left ventricle prior to the virtual surgical procedure (480). FIGS. 4B-4E show a close-up view of the mitral valve repair as shown through a series of actions. FIG. 4F shows a zoomed out view summarizing the post-operative state of the mitral valve repair (490). Specifically, FIG. 4B shows the mitral valve after excision of the triangular section of the prolapsing segment. This reflects the condition after FIG. 3A and before FIG. 3B. In FIG. 4B, the anterior (406) and posterior (408, 410) leaflets of the mitral valve are shown. The prolapsing segment has already been excised leaving a triangular defect (412). The edge of the remaining leaflet is labeled with the arrow (404). FIG. 4C corresponds to FIG. 3B. In FIG. 4C, virtual sutures (422) are seen in place and now bridge the defect in the posterior leaflet. Similar to FIG. 3C, FIG. 4D shows the repair after the leaflet sutures have been virtually tied (422) bringing the edges of the posterior leaflet together. Similar to FIG. 3D, FIG. 4E shows virtual sutures in place between a supporting annuloplasty ring and the edge of the mitral valve orifice (462). The aorta is seen (482). In FIG. 4F, the ring (462) has been virtually secured in place.

Figure 5:
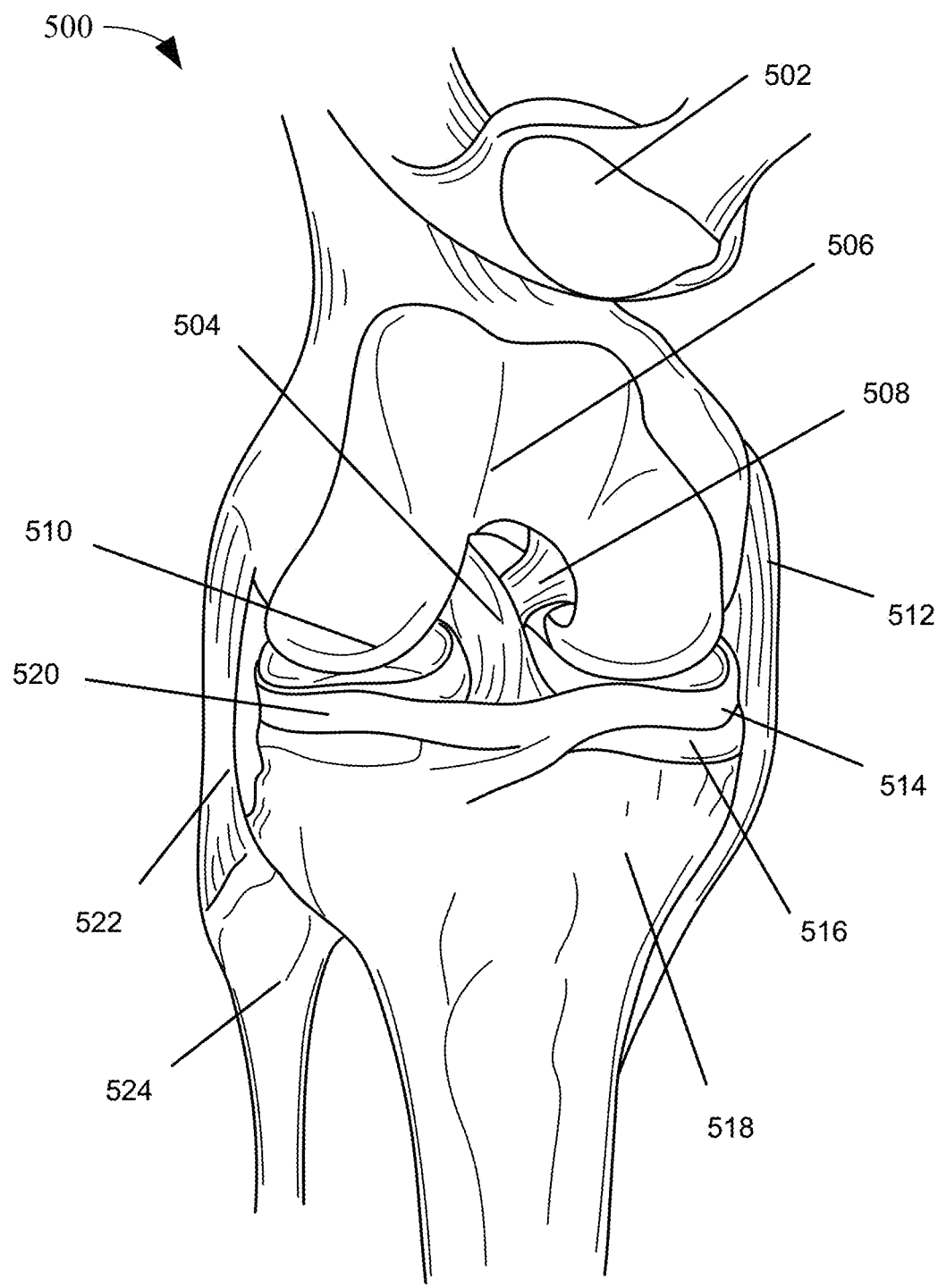
FIG. 5 illustrates an example of human knee, in accordance with various embodiments of the present disclosure.

FIG. 5 illustrates an example of human knee (500), in accordance with various embodiments of the present disclosure. Right knee (500) is presented in surgical language and reflects a description of anatomy that may be encountered in a textbook. The undersurface of the patella, or knee cap, is shown dissected and reflected off (502). The anterior cruciate ligament (504), patellofemoral groove (506), posterior cruciate ligament (508), lateral distal femoral condyle (510), tibial or medial collateral ligament (512), medial meniscus (514), tibial plateau (516), tibia (518), lateral meniscus (520), lateral or fibular collateral ligament (522), and fibula (524) have been labeled. These are anatomic structures of clinical importance as it generally relates to knee function as well as anatomy relevant to surgical operations as well as non-surgical invasive procedures. This figure also illustrates an example of information that a user may provide, using surgical language, in certain embodiments of the present disclosure.

Figure 6A:
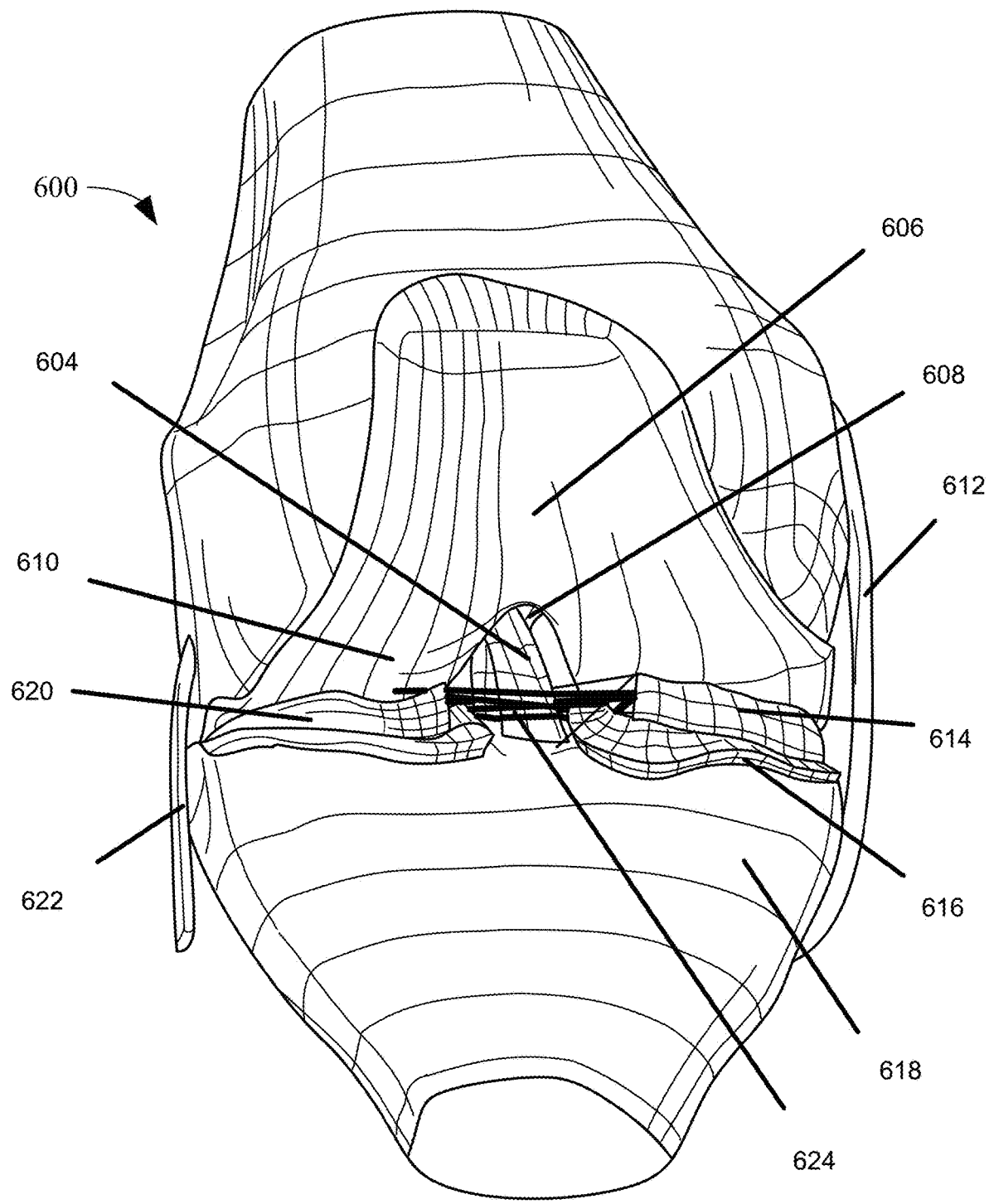
FIG. 6A illustrates a simulated model of a human knee, in accordance with various embodiments of the present disclosure.

FIG. 6A illustrates a computational model of a human knee, in accordance with various embodiments of the present disclosure. This drawing is representative of a three dimensional mesh of a right knee (600) as used for computational simulation of knee mechanics. The mesh includes all of the anatomic structures of importance to the simulation task at hand. In this example, the patella and fibula are not required although these anatomic structures may be described in a textbook or provided by the user using surgical language. In some embodiments of the present disclosure, the patella and fibula may be included. The portions of computational mesh representing the anterior cruciate ligament (604), patellofemoral groove (606), posterior cruciate ligament (608), lateral distal femoral condyle (610), tibial or medial collateral ligament (612), medial meniscus (614), tibial plateau (616), tibia (618), lateral meniscus (620), lateral or fibular collateral ligament (622), and fibula (624) have been labeled. These are anatomic structures of clinical importance as it generally relates to knee function as well as anatomy relevant to surgical procedures as well as non-invasive interventions. For the purpose of computational simulation, anatomic structures that are present and required for realistic and accurate results computed by the solver module but not commonly discussed in medical textbooks may be included. In this example, the three dimensional mesh includes representation of the transverse meniscomeniscal or anterior intermeniscal ligament (624) even if it has not been provided by the user.

Figure 6B:
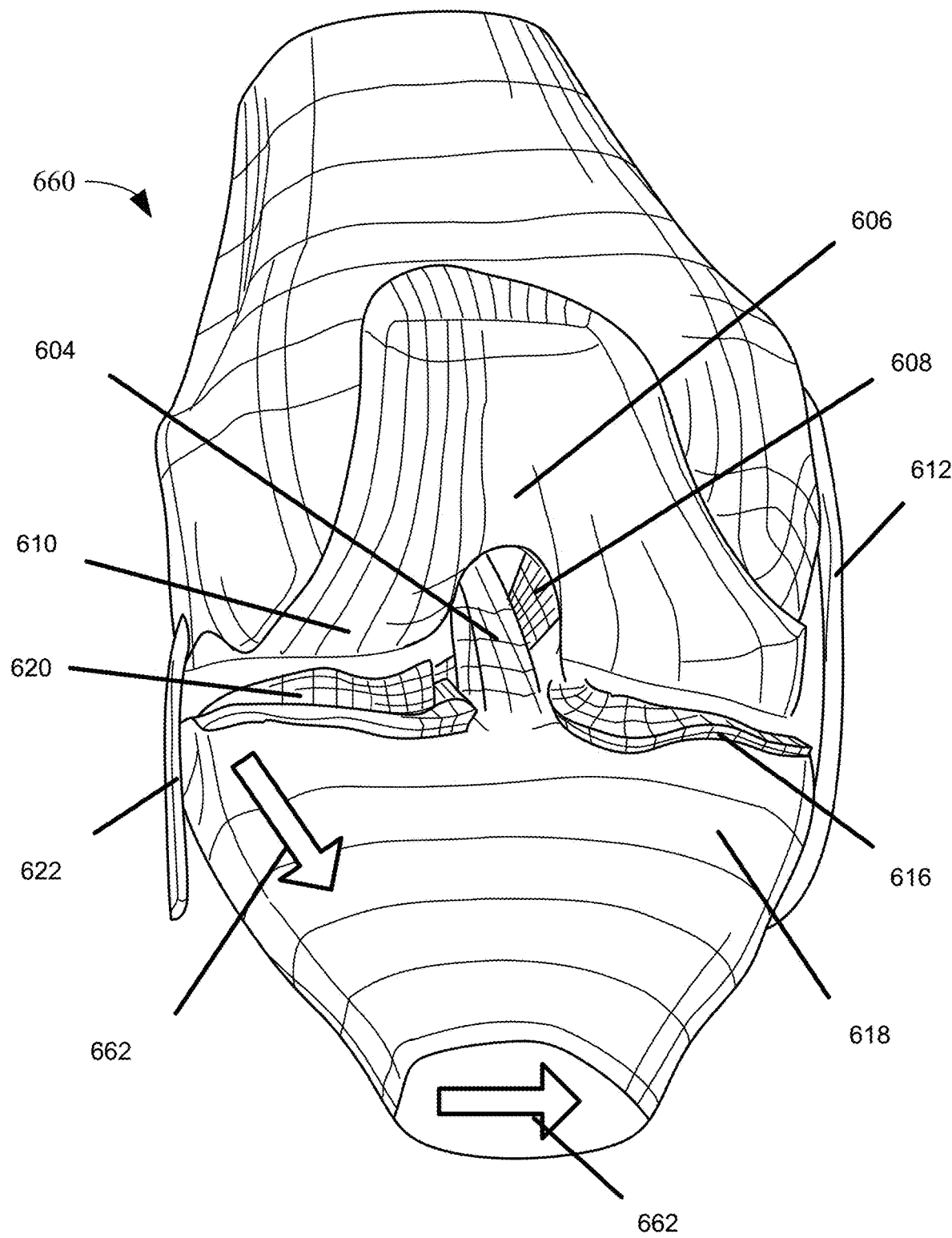
FIG. 6B illustrates a simulated model of a human knee that has undergone a medial meniscectomy, in accordance with various embodiments of the present disclosure.

FIG. 6B illustrates a simulated model of a human knee (660) that has undergone a medial meniscectomy, in accordance with various embodiments of the present disclosure. This drawing is representative of a three dimensional mesh of a right knee that has undergone a total medial meniscectomy as used for computational simulation of knee mechanics. The mesh includes all of the anatomic structures of importance to the simulation task at hand. In this example, the patella and fibula are not required although these anatomic structures may be described in a textbook or provided by the user using surgical language. In some embodiments of the present disclosure, the patella and fibula may be included. The portions of computational mesh representing the anterior cruciate ligament (604), patellofemoral groove (606), posterior cruciate ligament (608), lateral distal femoral condyle (610), tibial or medial collateral ligament (612), medial meniscus (614), tibial plateau (616), tibia (618), lateral meniscus (620), lateral or fibular collateral ligament (622), and fibula (624) have been labeled. These are anatomic structures of clinical importance as it generally relates to knee function as well as anatomy relevant to surgical procedures as well as non-invasive interventions. For the purpose of computational simulation, anatomic structures that are present and required for realistic and accurate results computed by the solver module but not commonly discussed in medical textbooks may be included. The output of the solver module, indicates that the removal of the medial meniscus results in a directional force represented by the arrows (662). There is an increase in the gap or distance between the lateral meniscus (620) and lateral distal femoral condyle (610). In this embodiment, the output of the solver module could be processed by the clinical translation module and described in surgical language as a "*varus* moment."

Figure 7:
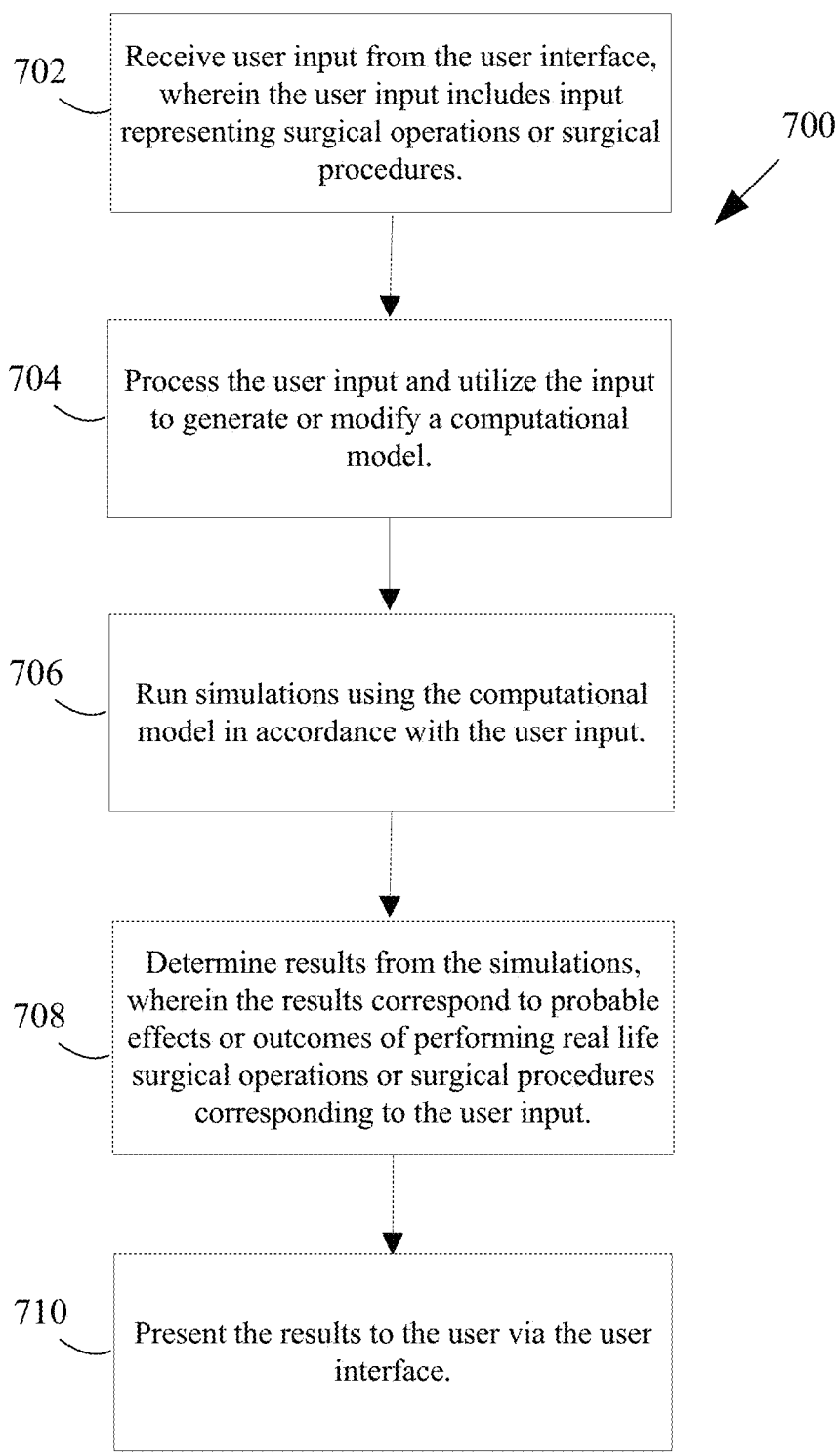
FIG. 7 is a flow chart illustrating an exemplary process for performing virtual surgery, in accordance with various embodiments of the present disclosure.

FIG. 7 is a flow chart illustrating an exemplary process (700) for performing virtual surgery, in accordance with various embodiments of the present disclosure. First, a virtual surgery system, e.g. system 100, receives (702) user input from the user interface. The user input includes input representing surgical operations or surgical procedures. Next, the system processes (704) the user input and utilizes the input to generate or modify a computational model. Subsequently, the system runs (706) simulations using the computational model in accordance with the user input. Then, the system determines (708) results from the simulations. In some embodiments, the results correspond to probable effects or outcomes of performing real life surgical operations or surgical procedures corresponding to the user input. Last, the system presents (710) the results to the user via the user interface.

In the present disclosure, the clinical translation module determines the relevant output from the solver module to be provided in surgical language. In some embodiments, for example in orthopedic surgery, solver output can be translated into surgical language to determine if an intended surgical implant fits well or does not fit well. Criteria for a "good" fit may additionally be provided. In some embodiments, as in for cardiac surgery, the solver output will be translated into surgical language to describe the cardiac output, myocardial wall stress, or stroke volume as a result of a surgical operation or non-surgical invasive procedure. In other embodiments, the user may specify the relevant output to be reported by the solver module and the preferred translation into surgical language.

In some implementations, further processing of the clinical information is performed by an information integration module which converts the clinical information into a format usable by the solver module or a format appropriate for further processing by the clinical translation module. In some implementations, the conversion is performed in an automated fashion by a computer. In some implementations, the conversion is performed in a semi-automated fashion where approval and confirmation is required. In some implementations, the confirmation is performed by the user performing the simulation. In other implementations, the confirmation is performed by a different user from the user performing the simulation.

In some implementations, once the data which has been fully analyzed and processed by the information integration module, the clinical translation module translates the steps of the surgery or procedure in the queue into a format usable by the solver module. As an example, an example of one surgical step in a virtual surgery is presented below. For instance, a "simple, interrupted stitch" which is the equivalent of sticking a needle through one piece and then another and then tying the free ends of the suture together, can be implemented by identifying the portion of the geometric mesh describing the location of the sutures, the material properties of the suture to be used, and the loading conditions which reflect the manner in which the surgical knot is performed. According to various embodiments, the system can simulate multiple different types of stiches as well as different types of cutting of tissue or altering the shape of different organs or tissues. According to various embodiments, the system can simulate multiple surgical steps that represent one virtual surgery or many virtual surgeries.

According to various embodiments, the virtual instructions are converted into an "input file" for use with the solver module. In some embodiments, the input file has coordinates for elements representing a geometric mesh, descriptions of the material properties for each element, and the loading conditions reflecting one or more steps of a surgery. The input file is then passed onto the solver module that computes the result of the surgeon's action or actions.

According to various embodiments, the solver module outputs data in the format of numbers describing how the coordinates of each element of the mesh have changed after surgery as well as the forces, stress and strain that affect each part of the portion of the human body to be analyzed. In some embodiments, other information relevant to the computational outcome of the surgery is included by the solver module. This data may include information that is not in surgical language such as a large database of numbers that can be very difficult for a user to interpret and understand.

According to various embodiments, the clinical translation module then modifies the output to reflect the next step or steps of the user queue to produce a new input for the solver module, determines that the surgery is complete, or awaits further user input.

According to various embodiments, the clinical translation module then converts the numerical information and other non-surgical language from the solver into a clinically useful presentation of the outcome of the surgery using surgical language. In some embodiments, this can be a graph of pressure on the surface of a portion of the joint, a color-coded picture or video, a description of the change in a parameter such as stroke volume, or even a simple pass/fail statement. In some embodiments, the information is delivered to the surgeon so that he/she can determine the best surgical plan for the patient.

In some embodiments, the system translates the output from the solver into surgical language using touch, e.g. the tactile resistance of a surgical screwdriver traveling through bone of different density, a vibration on a surgical instrument, or heat of surgical saw.

In some embodiments, the system translates the output from the solver into surgical language using sound, e.g. an audible tone, the change in pitch of a surgical drill going from a low to high density portion of bone, the change in rate and rhythm of a beating heart.

In some embodiments, the system can be used to train surgeons on surgical procedures. In some embodiments, the system can be designed such multiple simulations with different outcomes can be accessed by a user. The system can also be designed to only allow a limited selection of surgical procedures or operations.

In some embodiments, the system is used prior to the actual surgery or procedure to provide the outcome of the virtual surgery in surgical language before the actual surgery or procedure is performed.

In some embodiments, the system is used during the actual surgery or procedure to provide an on-going predictive outcome of the surgery as the surgery or procedure is being performed.

In some embodiments, the system is used after the actual surgery or procedure is complete to provide a retrospective comparison between the true results and the predicted results.

In some embodiments, the system is used in a combination of time periods before, during, and after surgery.

In some embodiments, the system is used to develop, optimize, or otherwise evaluate a device or instrument intended for use as a part of the surgery.

In some embodiments, the software used for computational modeling can be LS-DYNA. LS-DYNA, is a finite element software, originally designed by military scientists. It allows computers to solve a very large set of partial differential mathematical equations on supercomputers. LS-DYNA only accepts input files in its own proprietary format and outputs numbers and data, which may be difficult to interpret by surgeons. The following represents an exemplary input file representing a cube of aluminum containing a geometric mesh of one element and eight nodes, one material property consistent with aluminum, and one loading condition in LS-DYNA:

```
*KEYWORD
*TITLE
Example of aluminum cube deformation
$ output parameters
*CONTROL_TERMINATION
    1.
*DATABASE_BINARY_D3PLOT
    .1
$ geometric mesh
*PART
aluminum_cube
    1  1  1
*SECTION_SOLID
    1
*NODE
    1  0  0  0  7  7
    2  1  0  0  5  0
    3  1  1  0  3  0
    4  0  1  0  6  0
    5  0  0  1  4  0
```

-continued

```
    6  1  0  1  2  0
    7  1  1  1  0  0
    8  0  1  1  1  0
*ELEMENT_SOLID
    1  1  1  2  3  4  5  6  7  8
$ material properties
*MAT_ELASTIC
    1  2700.  70.e+09  .3
$ loading conditions
*LOAD_SEGMENT
    1  1  0  5  6  7  8
*DEFINE_CURVE
    1
         0          0
         1    70.e+05
```

In some embodiments, the input required for realistic surgical simulation requires more than one element or node to be described. In one example, a computational model of a right knee may have over 88,000 nodes and over 74,000 elements. The amount of input is dependent on the complexity of the anatomy being simulated and the virtual surgery to be performed and therefore does not have an upper or lower limit.

In some embodiments, the solver module can be LS-DYNA. The output from the solver module describing the coordinates of each element of the mesh that have changed after simulation as well as the forces, stress and strain is a large database of numbers which requires effort to interpret. The database of numbers can be thousands to pages to hundreds of thousands of pages. The amount of output is dependent on the complexity of the anatomy being simulated and therefore does not have an upper or lower limit The following represents an exemplary output of the numerical data produced by LS-DYNA for a representing a cube of aluminum containing a geometric mesh of one element and eight nodes, one material property consistent with aluminum, and one loading condition:

```
*KEYWORD
$TIME_VALUE = 9.9999309e-001
$STATE_NO = 11
*ELEMENT_SOLID
    1  1  1  2  3  4  5  6  7  8
*NODE
    1  0.0000000e+000  0.0000000e+000  0.0000000e+000
    2  1.0000300e+000  0.0000000e+000  0.0000000e+000
    3  1.0000300e+000  1.0000300e+000  0.0000000e+000
    4  0.0000000e+000  1.0000300e+000  0.0000000e+000
    5  0.0000000e+000  0.0000000e+000  9.9990004e-001
    6  1.0000300e+000  0.0000000e+000  9.9990004e-001
    7  1.0000300e+000  1.0000300e+000  9.9990004e-001
    8  0.0000000e+000  1.0000300e+000  9.9990004e-001
*INITIAL_VELOCITY_NODE
    2  -9.620E-6   0.0       0.0
    3  -9.620E-6  -9.620E-6  0.0
    4   0.0       -9.620E-6  0.0
    5   0.0        0.0      -2.095E-5
    6  -9.620E-6   0.0      -2.095E-5
    7  -9.620E-6  -9.620E-6 -2.095E-5
    8   0.0       -9.620E-6 -2.095E-5
*END
$NODAL_DISPLACEMENT
    1  0.0000000e+000  0.0000000e+000  0.0000000e+000
    2  3.0040741e-005  0.0000000e+000  0.0000000e+000
    3  3.0040741e-005  3.0040741e-005  0.0000000e+000
    4  0.0000000e+000  3.0040741e-005  0.0000000e+000
    5  0.0000000e+000  0.0000000e+000  -9.9956989e-005
    6  3.0040741e-005  0.0000000e+000  -9.9956989e-005
    7  3.0040741e-005  3.0040741e-005  -9.9956989e-005
    8  0.0000000e+000  3.0040741e-005  -9.9956989e-005
$NODAL_RESULTS
```

-continued

```
$RESULT OF
    1  2.1125E-36
    2  0.0
    3  7.9903E-36
    4  0.0
    5  3.6434E-44
    6  4.2039E-44
    7  4.6243E-44
    8  5.1848E-44
```

In some embodiments, the output required for realistic surgical simulation requires more than one element or node to be described. In one such example, a computational model of a right knee may have over 88,000 nodes and over 74,000 elements. The amount of output is dependent on the complexity of the anatomy being simulated and the virtual surgery to be performed and therefore does not have an upper or lower limit.

Figure 8:
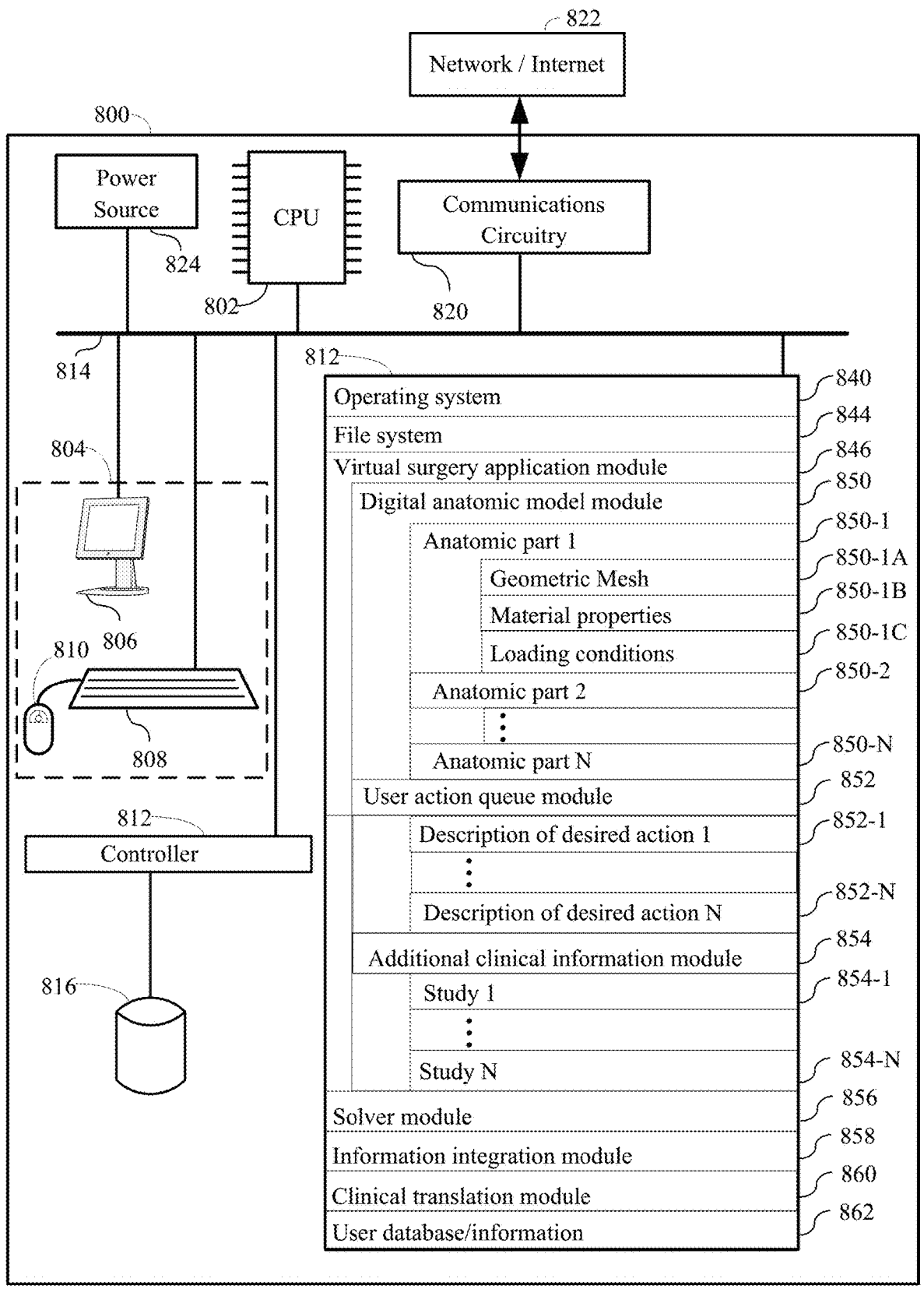
FIG. 8 is a block diagram illustrating an example of a computer system capable of implementing various processes described in the present disclosure.

FIG. 8 is a block diagram illustrating an example of a computer system capable of implementing various processes described in the present disclosure. The system 800 typically includes a power source 824; one or more processing units (CPU's) 802 for executing modules, programs and/or instructions stored in memory 812 and thereby performing processing operations; one or more network or other communications circuitry or interfaces 820 for communicating with a network 822; controller 812; and one or more communication buses 814 for interconnecting these components. In some embodiments, network 822 can be the another communication bus, the Internet, an Ethernet, an Intranet, other wide area networks, local area networks, and metropolitan area networks. Communication buses 814 optionally include circuitry (sometimes called a chipset) that interconnects and controls communications between system components. System 800 optionally includes a user interface 804 comprising a display device 806, a keyboard 808, and a mouse 810. Memory 812 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 812 may optionally include one or more storage devices 816 remotely located from the CPU(s) 802. Memory 812, or alternately the non-volatile memory device(s) within memory 812, comprises a non-transitory computer readable storage medium. In some embodiments, memory 812, or the computer readable storage medium of memory 812 stores the following programs, modules and data structures, or a subset thereof:

- an operating system 840 that includes procedures for handling various basic system services and for performing hardware dependent tasks;
- a file system 844 for storing various program files;
- a virtual surgery application module 846 for a user to provide clinical imaging and other clinical information to the clinical translation module, to make modifications to virtual anatomy, to review the output from the solver module.
- a solver module 856 for receiving input from a clinical translation module 860 and computes the outcome of a surgery defined by one or more geometric meshes, material properties, and loading conditions and provides that output to the clinical translation module using methods that represent true physical phenomena with sufficient accuracy to reflect clinical reality.
- an information integration module 858 that processes clinical imaging and other clinical information to generate or modify a geometric mesh, a material property or a loading condition for use with solver module 856 or for use with a clinical translation module 860.
- a clinical translation module 860 that receives input from and provides output to the virtual surgery application module 846, that provides input to and receives output from the solver module 856, that provides and/or receives input and/or output to the information integration module and performs translation to and from surgical language.
- and a user database 862 for storing user information, for example first and last name, passwords, contact information, and billing or subscription information.

Virtual surgery application module 846 may include the following submodules, or a subset thereof:

- a digital anatomic model module 850 containing the following fields and subfields, or a subset thereof: geometric mesh (mesh ID, mesh elements, nodes, parts, sections), material property (material property ID, constitutive equation, constant [1-N]), loading conditions (loading condition ID, loading condition type, direction, magnitude, constant [1-N]). Multiple geometric meshes exist. In some embodiments, these can be divided into parts and sections. Multiple parts can be assigned to a single mesh ID and can represent a portion of anatomy. Multiple sections can be assigned to a single part ID. Multiple elements can be assigned to a single section ID. Multiple nodes can be assigned to a single element ID. In various embodiments, these subsets describe the appearance of anatomy and allows each relevant component of the anatomy to be uniquely assigned material properties and loading conditions as appropriate.
- a user action queue module 852 containing the following fields and subfields, or a subset thereof: action ID, queue position, action, time_of_action. Each action performed by the user is assigned an action ID. Multiple actions can share a single queue position. The action can be modification of anatomy through surgical language or direct interaction with a geometric mesh, material property or loading condition. The action can also be a request for output from the system through surgical language or in terms of a geometric mesh, material property and other data associated physical properties. The time of action is combined with queue position to precisely determine when an action is simulated.
- an additional clinical information module 854 containing the following fields and subfields, or a subset thereof: clinical_info_ID, clinical_data [1-N], datatype. Each item of clinical information is assigned a unique ID. The clinical_data can be in arbitrary text or binary format with the datatype defining the type of data.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 812 may store a subset of the modules and data structures identified above. Furthermore, memory 812 may store additional modules and data structures not described above.

Although FIG. 8 shows a "virtual surgery simulation system," FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement a virtual surgery simulation system and how features are allocated among them will vary from one implementation to another, and may depend in part on the amount of data traffic that the system must handle during peak usage periods as well as during average usage periods.

According to various embodiments, the system includes software that implements a graphical user interface that allows surgeons to describe their surgical plan on a patient, whether it is a cardiac surgery or orthopedic surgery patient, using surgical language they are familiar with. Similarly the system will incorporate software that presents the solution or outcome of the surgery in a format using surgical language.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A method comprising:
   determining a computational model associated with a surgical scenario, wherein the computational model comprises one or more of: a geometric mesh, one or more material properties, and one or more loading conditions;
   receiving, via a user interface, a user input, wherein the user input comprises one or more surgical operations or non-surgical invasive procedures;
   determining, based on the user input one or more modifications to the computational model, the geometric mesh, the one or more material properties, or the one or more loading conditions;
   determining, based on the one or more modifications and one or more simulations, one or more mathematical representations of one or more surgical outcomes;
   determining one or more simulation results from the one or more simulations;
   determining an ideal result associated with the one or more surgical operations or non-surgical invasive procedures;
   comparing the ideal result and the one or more simulation results;
   converting at least a portion of one or more of the one or more simulation results and the ideal result into surgical language; and
   presenting, via the user interface, the converted at least a portion of the one or more simulation results and the comparison of the ideal result and the one or more simulation results to the user via the user interface.

2. The method of claim 1, further comprising processing the user input, wherein processing the user input comprises sending pre- and post-processing data to a solver module.

3. The method of claim 1, wherein the computational model is a finite element model.

4. The method of claim 1, wherein the user input includes input from a keyboard, mouse, camera, microphone, tablet, cellular phone, any hand-held device, or any haptic device capable of performing motions or functions representing surgical operations or other non-surgical invasive procedures that effect anatomic structures.

5. The method of claim 1, wherein the user input is sent via a web browser or any application with access to a communications network.

6. The method of claim 2, wherein processing the user input comprises performing one more actions in a queue, utilizing the user input to generate or modify a computational anatomic model, the computational anatomic model being divided into one or more parts including a geometric mesh, material properties, and loading conditions.

7. The method of claim 1, wherein the user input is pre-processed before being received.

8. The method of claim 1, further comprising converting clinical imaging or information, such as blood pressure, height, weight, and lab results, into data and representing the data in a computational model including a geometric mesh, material properties, and loading conditions.

9. The method of claim 1, wherein the user input includes surgical language and processing the user input includes converting, via a clinical translation module, the surgical language to changes or discrete values in a geometric mesh, material properties, or loading conditions of a computational model.

10. The method of claim 1, wherein converting the at least a portion of the one or more of the one or more simulation results and the ideal result into surgical language comprises converting output geometric mesh, the one or more material properties, or other data with associated physical properties into surgical language.

11. The method of claim 1, further including validating user information submitted from a user system to a clinical system.

12. A system comprising:
   a user device with a user interface; and
   a computer, including a processor and memory, configured for:
   determining a computational model associated with a surgical scenario, wherein the computational model comprises one or more of:
   a geometric mesh, one or more material properties, and one or more loading conditions;
   receiving, via a user interface, a user input, wherein the user input comprises one or more surgical operations or non-surgical invasive procedures;
   determining, based on the user input, one or more modifications to the computational model, the geometric mesh, the one or more material properties, or the one or more loading conditions;
   determining, based on the one or more modifications and one or more simulations, one or more mathematical representations of one or more surgical outcomes;
   determining one or more simulation results from the one or more simulations;
   determining an ideal result associated with the one or more surgical operations or non-surgical invasive procedures;

comparing the ideal result and the one or more simulation results;

converting at least a portion of one or more of the one or more simulation results and the ideal result into surgical language; and presenting, via the user interface, the converted at least a portion of the one or more simulation results and the comparison of the ideal result and the one or more simulation results to the user via the user interface.

13. The system of claim 12, wherein the system is further configured to process the user input, wherein processing the user input comprises sending pre- and post-processing data to a solver module.

14. The system of claim 13, wherein processing the user input comprises performing one more actions in a queue, utilizing the user input to generate or modify a computational anatomic model, the computational anatomic model being divided into one or more parts including a geometric mesh, material properties, and loading conditions.

15. The system of claim 12, wherein the user input includes input from a keyboard, mouse, camera, microphone, tablet, cellular phone, any hand-held device, or any haptic device capable of performing motions or functions representing surgical operations or other non-surgical invasive procedures that effect anatomic structures.

16. The system of claim 12, wherein the system is further configured to convert clinical imaging or information, such as blood pressure, height, weight, and lab results, into data and representing the data in a computational model including a geometric mesh, material properties, and loading conditions.

17. The system of claim 12, wherein the user input includes surgical language and processing the user input includes converting, via a clinical translation module, the surgical language to changes or discrete values in a geometric mesh, material properties, or loading conditions of a computational model.

18. The system of claim 12, wherein the system is further configured to convert the at least a portion of the one or more of the one or more simulation results and the ideal result into surgical language by converting an output geometric mesh, the one or more material properties, or other data with associated physical properties into surgical language.

19. The system of claim 12, further including validating user information submitted from a user system to a clinical system.

20. A non-transitory computer readable medium storing processor-executable instructions that, when executed by one or more processors, cause the one or more processors to:

determine a computational model associated with a surgical scenario, wherein the computational model comprises one or more of: a geometric mesh, one or more material properties, and one or more loading conditions;

receive, via a user interface, a user input, wherein the user input comprises one or more surgical operations or non-surgical invasive procedures;

determine, based on the user input, one or more modifications to the computational model, the geometric mesh, the one or more material properties, or the one or more loading conditions;

determine, based on the one or more modifications and one or more simulations, one or more mathematical representations of one or more surgical outcomes;

determine one or more simulation results from the one or more simulations;

determine an ideal result associated with the one or more surgical operations or non-surgical invasive procedures;

compare the ideal result and the one or more simulation results;

convert at least a portion of one or more of the one or more simulation results and the ideal result into surgical language; and present, via the user interface, the converted at least a portion of the one or more simulation results and the comparison of the ideal result and the one or more simulation results to the user via the user interface.

* * * * *